(12) United States Patent
Heishi et al.

(10) Patent No.: US 11,493,365 B2
(45) Date of Patent: Nov. 8, 2022

(54) LIGHT IRRADIATION DEVICE

(71) Applicant: Mitsubishi Electric Corporation, Tokyo (JP)

(72) Inventors: Akinori Heishi, Tokyo (JP); Ritsuya Oshima, Tokyo (JP); Masashige Suwa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/270,435

(22) PCT Filed: Aug. 28, 2018

(86) PCT No.: PCT/JP2018/031636
§ 371 (c)(1),
(2) Date: Feb. 23, 2021

(87) PCT Pub. No.: WO2020/044418
PCT Pub. Date: Mar. 5, 2020

(65) Prior Publication Data
US 2021/0255004 A1  Aug. 19, 2021

(51) Int. Cl.
G01D 5/34 (2006.01)
F21S 41/63 (2018.01)
F21V 14/06 (2006.01)

(52) U.S. Cl.
CPC ............... *G01D 5/34* (2013.01); *F21S 41/63* (2018.01); *F21V 14/06* (2013.01)

(58) Field of Classification Search
CPC ...... B60Q 1/0017; B60Q 1/0023; B60Q 1/12; B60Q 1/124; F21S 41/63; F21S 41/635; F21V 14/06; F21V 14/065; G01D 5/34
(Continued)

(56) References Cited

U.S. PATENT DOCUMENTS

| 4,675,531 A * | 6/1987 | Clark ................. G06K 7/10762 |
| | | 235/462.43 |
| 5,747,797 A * | 5/1998 | Fujita .................... H03M 1/308 |
| | | 250/231.14 |

(Continued)

FOREIGN PATENT DOCUMENTS

| JP | 63-184931 A | 7/1988 |
| JP | 8-129600 A | 5/1996 |

(Continued)

OTHER PUBLICATIONS

International Search Report and Written Opinion dated Oct. 30, 2018, received for PCT Application PCT/JP2018/031636, Filed on Aug. 28, 2018, 8 pages including English Translation.

(Continued)

*Primary Examiner* — Jong-Suk (James) Lee
*Assistant Examiner* — James M Endo
(74) *Attorney, Agent, or Firm* — Xsensus LLP

(57) ABSTRACT

A light irradiation device includes a light source, an optical member and a sensor. The light source emits light. The optical member is supported so as to rotate around a rotation axis and includes a prism part that emits detection light based on the light. The sensor receives the detection light and detects a light amount of the detection light. The light amount of the detection light received by the sensor changes depending on a position of the optical member in a rotation direction when the optical member rotates.

17 Claims, 12 Drawing Sheets

(58) Field of Classification Search
USPC .......................................................... 250/233
See application file for complete search history.

(56) References Cited

U.S. PATENT DOCUMENTS

| | | | | |
|---|---|---|---|---|
| 5,933,225 | A * | 8/1999 | Yamabuchi | G01S 17/931 180/169 |
| 10,111,295 | B1 * | 10/2018 | Belliveau | H05B 45/10 |
| 2002/0033459 | A1 * | 3/2002 | Graves | B60S 1/0822 250/573 |
| 2007/0081360 | A1 * | 4/2007 | Bailey | G02B 6/0028 362/621 |
| 2008/0048095 | A1 * | 2/2008 | Matheson | F21K 9/00 250/201.1 |
| 2008/0093530 | A1 * | 4/2008 | Hoelen | G01J 1/32 257/E33.076 |
| 2009/0212709 | A1 * | 8/2009 | Meijer | F21S 10/02 315/153 |
| 2010/0277087 | A1 | 11/2010 | Ikeda | |
| 2011/0310617 | A1 * | 12/2011 | Cornelissen | G02B 6/0026 362/257 |
| 2012/0194068 | A1 * | 8/2012 | Cheng | F21V 23/0457 313/523 |
| 2015/0204504 | A1 * | 7/2015 | Suwa | F21S 41/26 362/514 |
| 2015/0267888 | A1 * | 9/2015 | Suwa | F21S 41/635 362/512 |
| 2016/0290583 | A1 * | 10/2016 | Suwa | B62J 45/4151 |
| 2016/0341655 | A1 * | 11/2016 | Jha | F21V 5/045 |
| 2017/0184292 | A1 * | 6/2017 | Weeks | G01J 1/0407 |
| 2017/0347437 | A1 * | 11/2017 | Hager | F21V 7/0091 |
| 2018/0084617 | A1 * | 3/2018 | Zhang | F21V 5/04 |

FOREIGN PATENT DOCUMENTS

| | | |
|---|---|---|
| JP | 2003-81006 A | 3/2003 |
| JP | 2006-4442 A | 1/2006 |
| JP | 2009-176508 A | 8/2009 |
| JP | 2012-88227 A | 5/2012 |

OTHER PUBLICATIONS

Chinese Office Action dated Mar. 29, 2022, in corresponding Chinese Patent Application 201880096137.8, 15pp.

* cited by examiner

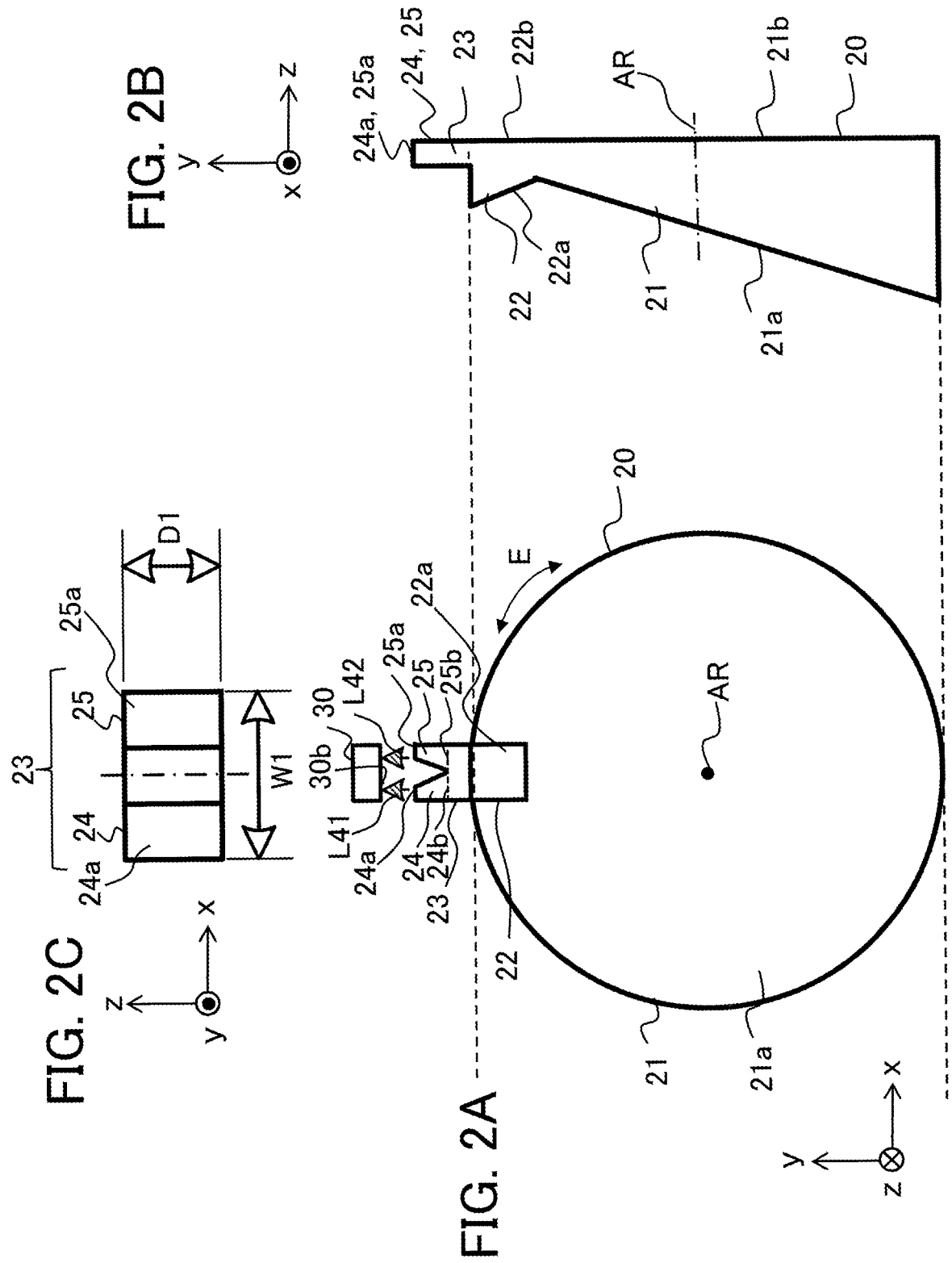

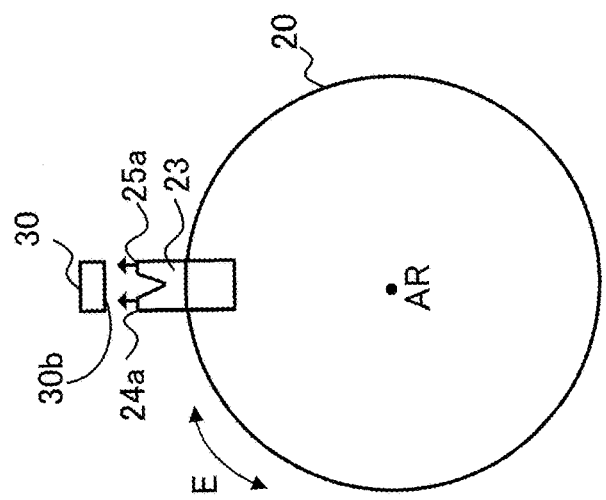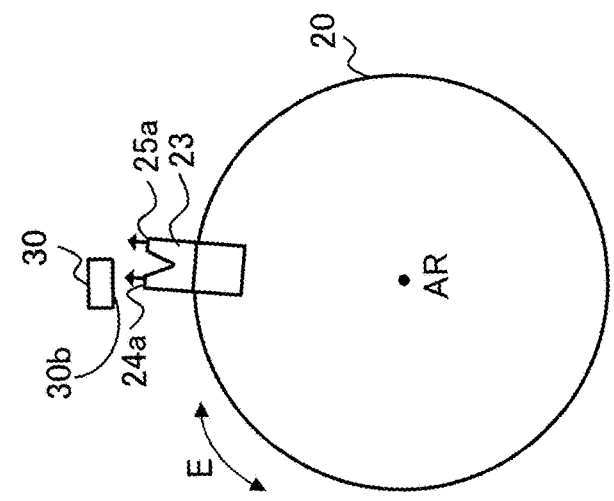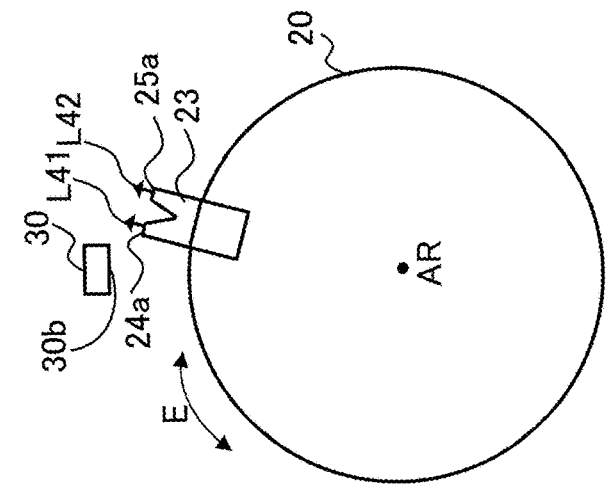

FIG. 4
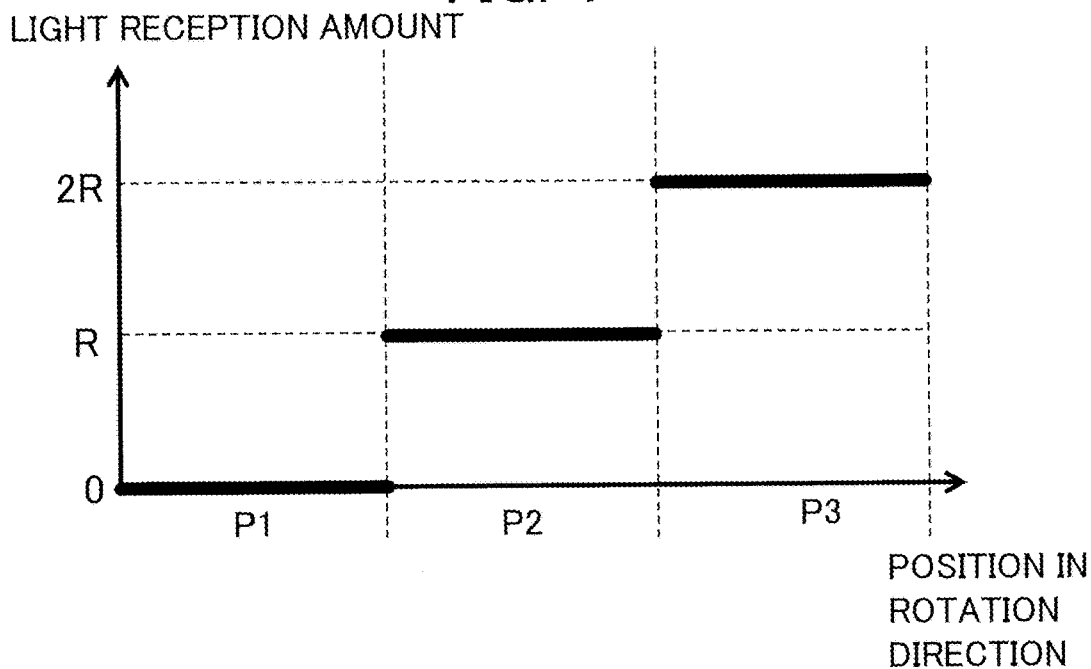
FIG. 5A
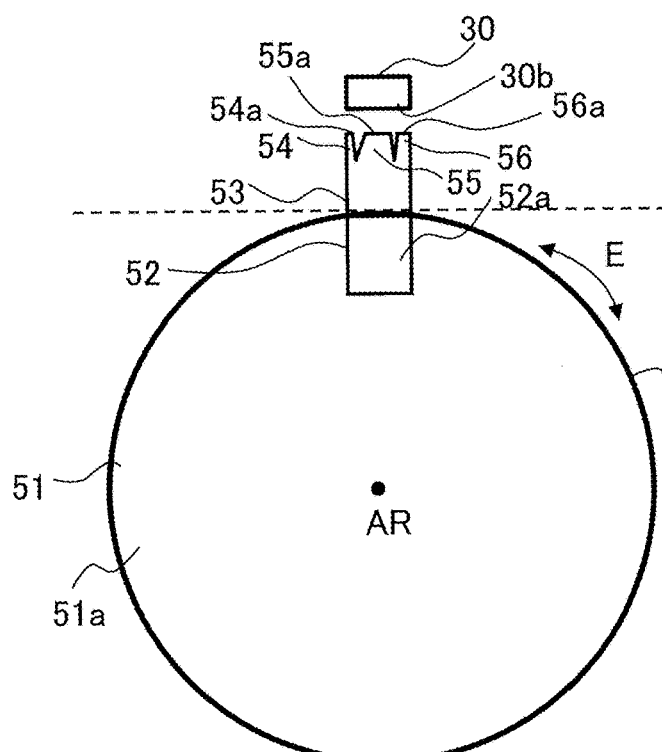
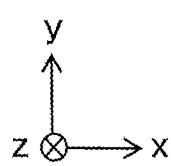
FIG. 5B
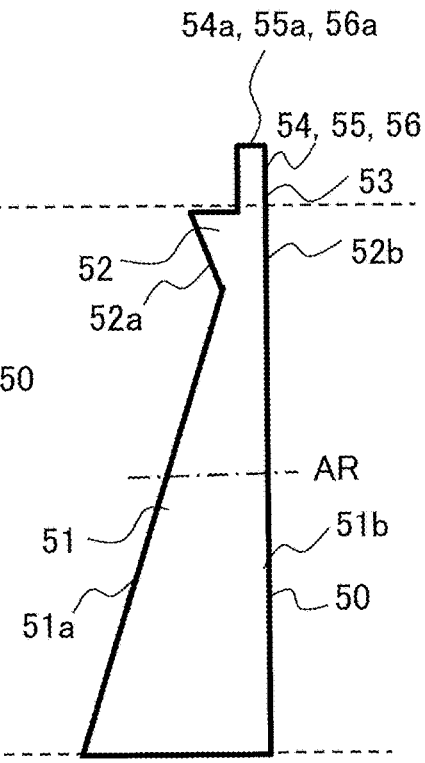
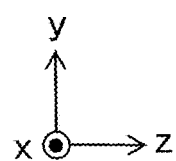

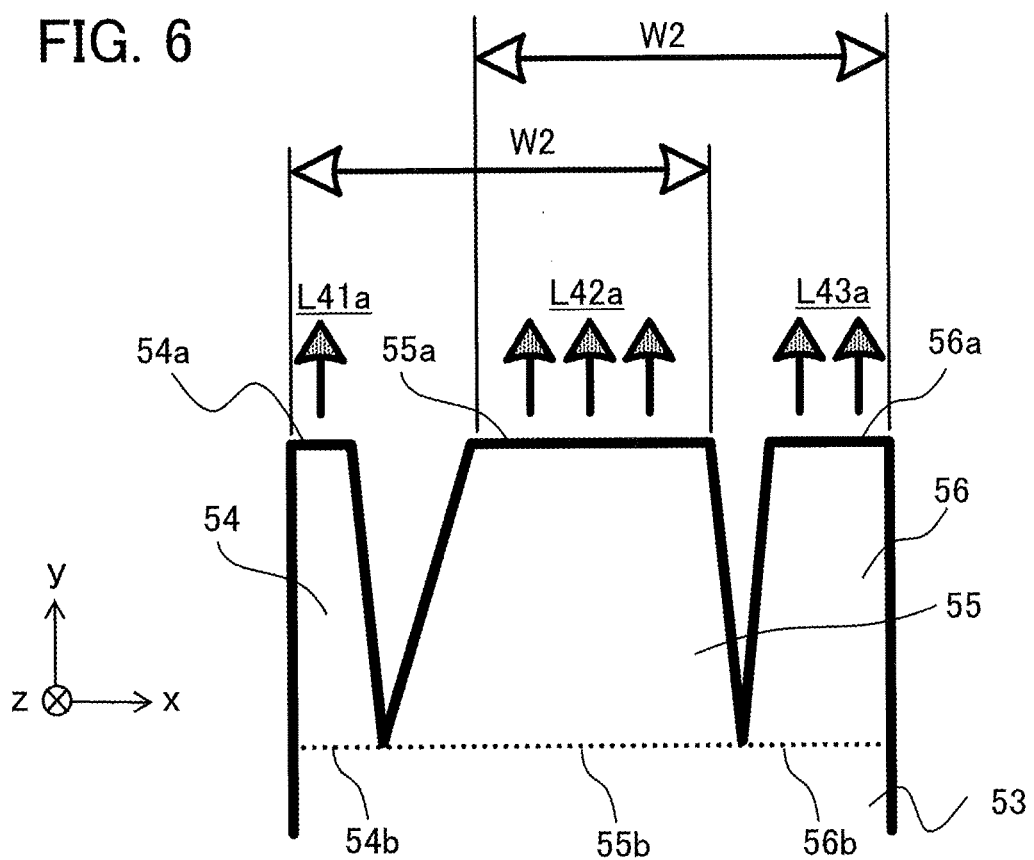

FIG. 8A
FIG. 8B
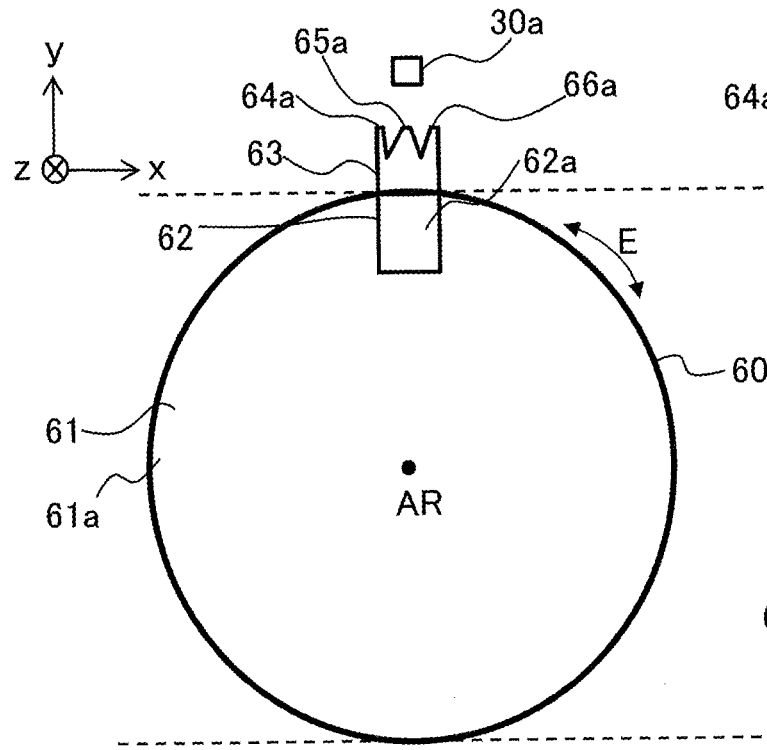
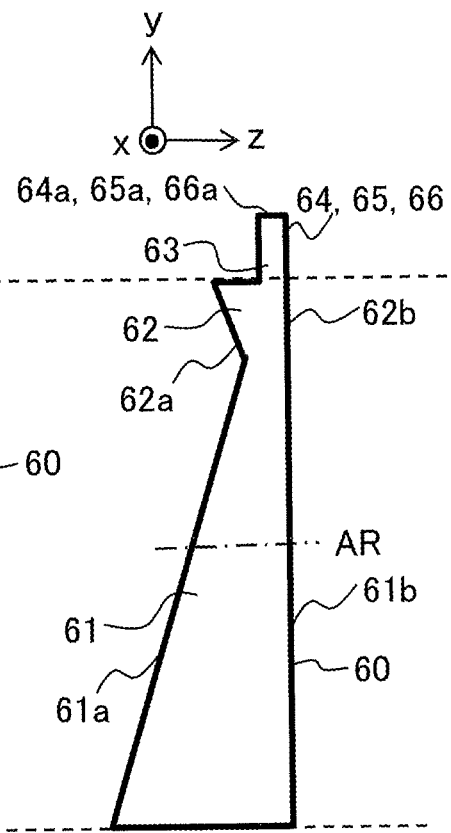
FIG. 9B
FIG. 9A
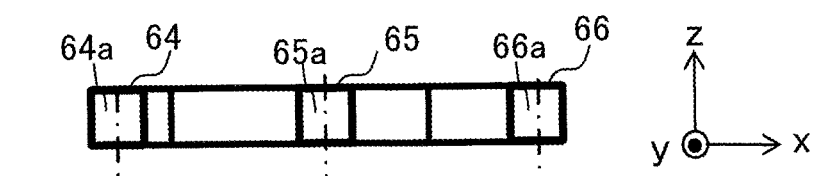
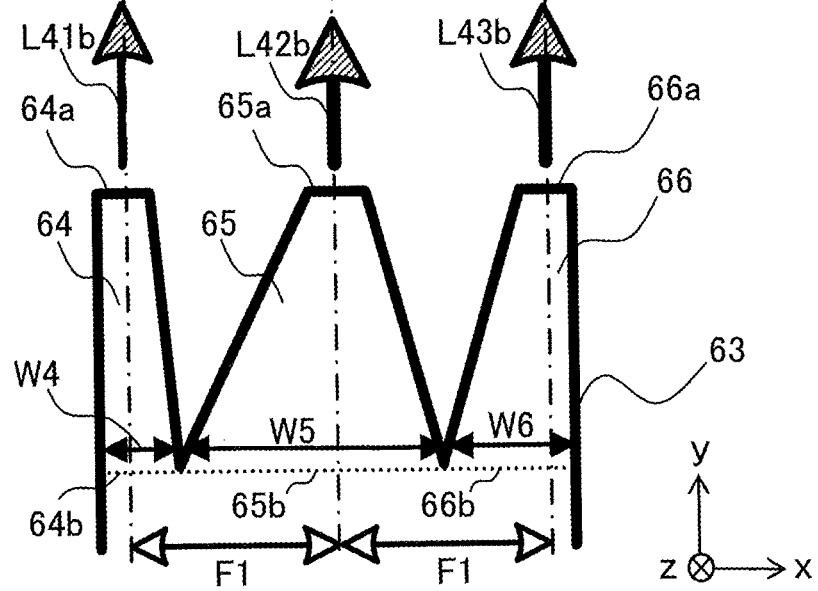

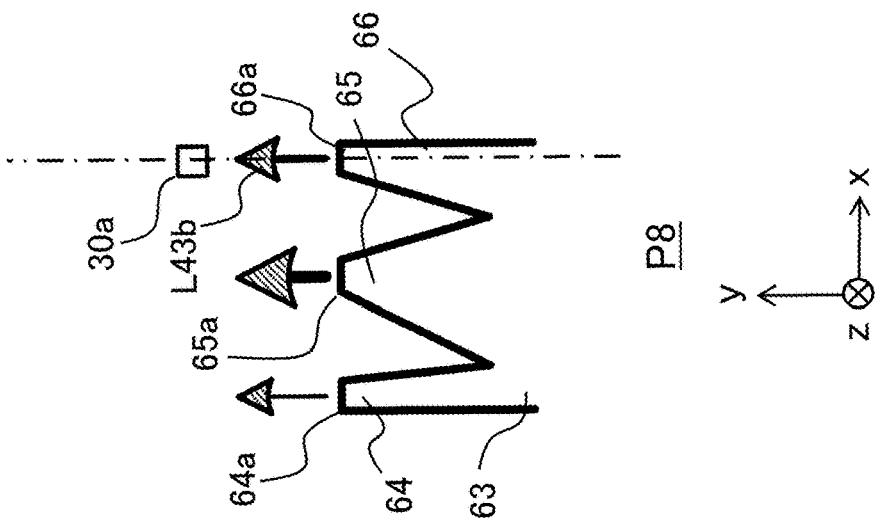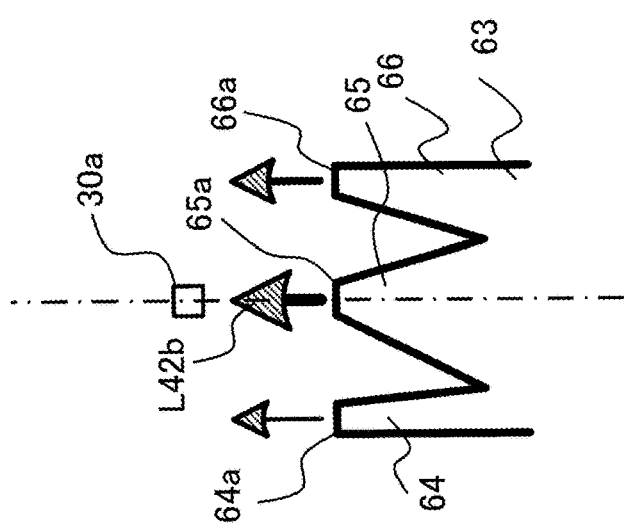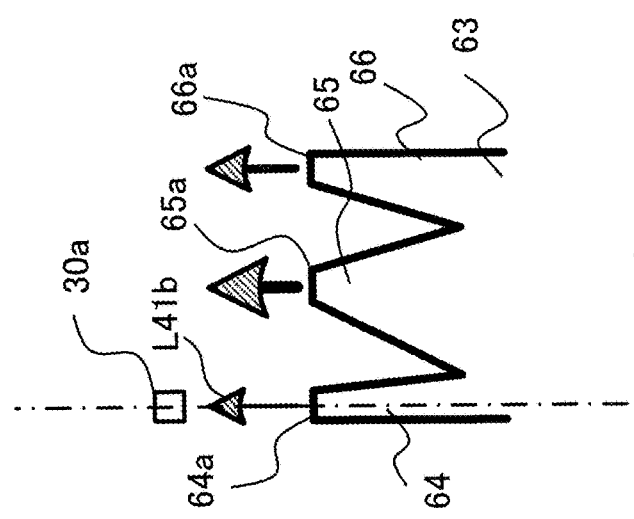

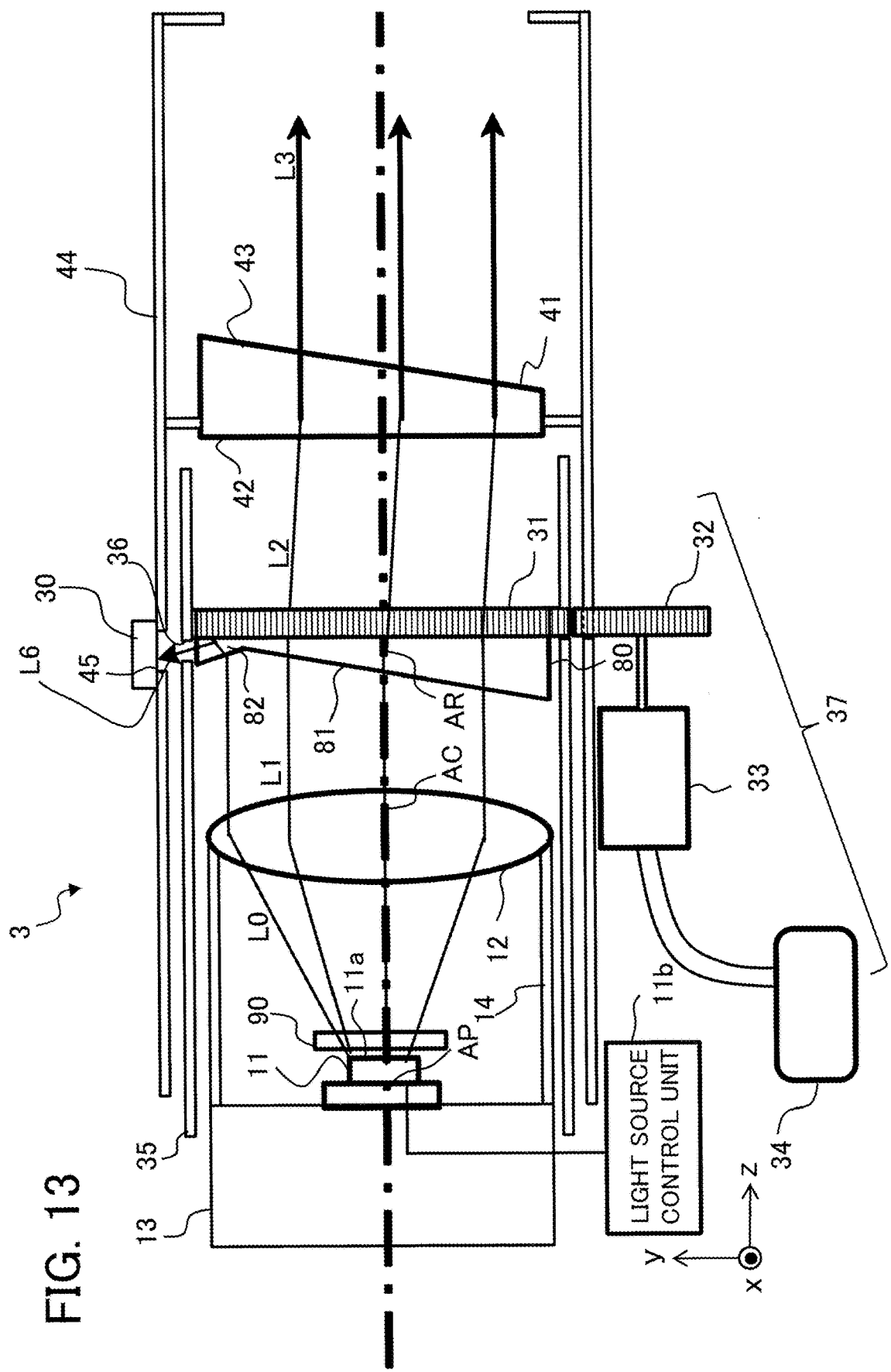

LIGHT IRRADIATION DEVICE

CROSS-REFERENCE TO RELATED APPLICATION

The present application is based on PCT filing PCT/JP2018/031636, filed Aug. 28, 2018, the entire contents of which are incorporated herein by reference.

TECHNICAL FIELD

The present invention relates to a light irradiation device that emits light.

BACKGROUND ART

For example, Patent Reference 1 describes a light distribution control system that controls light distribution of a head lamp illumination device corresponding to a steering angle of a steering wheel of a vehicle. In this light distribution control system, the steering angle of the steering wheel is detected by a steering sensor as a detection unit. The steering sensor includes a rotary plate having slits and rotating in conjunction with the steering of the steering wheel and a plurality of photointerrupters for detecting a rotation direction and a rotation amount (rotation angle) of the rotary plate.

PRIOR ART REFERENCE

Patent Reference

Patent Reference 1: Japanese Patent Application Publication No. 2003-81006 (see paragraphs 0010 to 0015, FIG. 1 and FIG. 2, for example)

SUMMARY OF THE INVENTION

Problem to be Solved by the Invention

However, each photointerrupter includes a light-emitting element and a photoreceptor element. The light-emitting element and the photoreceptor element are arranged to face each other via the rotary plate having the slits. Accordingly, there is a problem in that the configuration of the detection unit of the light distribution control system is complicated.

The present invention has been made to resolve the above-described problem with the conventional technology. An object of the present invention is to provide a light irradiation device capable of detecting the position of an optical member in the rotation direction with a simple configuration.

Means for Solving the Problem

A light irradiation device according to the present invention includes a light source that emits light, an optical member that is supported so as to rotate around a rotation axis and includes a first prism part that emits first detection light based on the light, and a sensor that receives the first detection light and detects a light amount of the first detection light. The light amount of the first detection light received by the sensor changes depending on a position of the optical member in a rotation direction when the optical member rotates.

Effect of the Invention

According to the present invention, the position of the rotatably supported optical member in the rotation direction can be detected with a simple configuration.

BRIEF DESCRIPTION OF THE DRAWINGS

FIG. 2A, FIG. 2B and FIG. 2C are a front view, a side view and a top view schematically showing an optical member of the light irradiation device according to the first embodiment.

FIG. 3A, FIG. 3B and FIG. 3C are diagrams showing the positional relationship between a light guide part of the optical member and an optical sensor in the light irradiation device according to the first embodiment.

FIG. 4 is a diagram showing the relationship between positions of the optical member of the light irradiation device according to the first embodiment in a rotation direction and the light amount of detection light received by the optical sensor.

FIG. 5A and FIG. 5B are a front view and a side view schematically showing an optical member of a light irradiation device according to a first modification of the first embodiment.

FIG. 6 is a front view schematically showing a light guide part of the optical member shown in FIG. 5A.

FIG. 8A and FIG. 8B are a front view and a side view schematically showing an optical member of a light irradiation device according to a second modification of the first embodiment.

FIG. 9A is a front view schematically showing a light guide part of the optical member shown in FIG. 8A, and FIG. 9B is a top view of light emission end parts of the light guide part.

FIG. 10A to FIG. 10C are diagrams showing a positional relationship between the light guide part of the optical member and the optical sensor shown in FIG. 8A.

FIG. 13 is a diagram schematically showing a configuration of a light irradiation device according to a third embodiment of the present invention.

MODE FOR CARRYING OUT THE INVENTION

Figure 1:
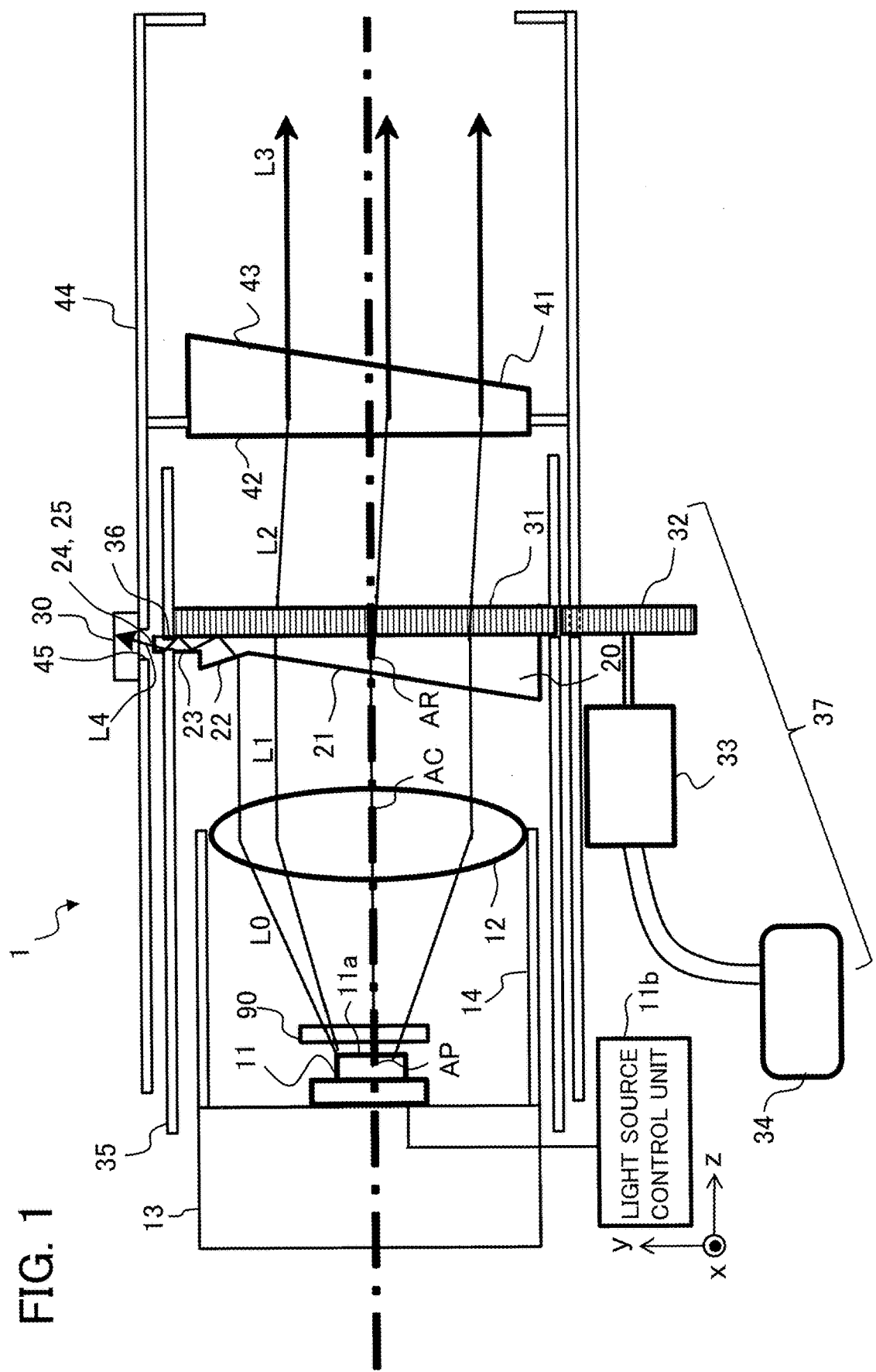
FIG. 1 is a diagram schematically showing a configuration of a light irradiation device according to a first embodiment of the present invention.

Light irradiation devices according to embodiments of the present invention will be described below with reference to drawings. The following embodiments are just examples and a variety of modifications are possible within the scope of the present invention.

For easy understanding of the relationship among the drawings, coordinate axes of an xyz orthogonal coordinate system are shown as needed in each drawing.

A z-axis is a coordinate axis parallel to a rotation axis of an optical member. For example, the z-axis is a coordinate axis parallel to an optical axis AP of a light source. Here, the light source is, for example, a light source 11 in FIG. 1 which will be explained later. A+z-axis direction is, for example, a direction in which light is emitted from the light source 11.

An x-axis is a coordinate axis orthogonal to the z-axis. The x-axis is, for example, a coordinate axis extending in a radial direction centering at the rotation axis of the optical member. The x-axis is parallel to a width direction of the light irradiation device, for example.

A y-axis is a coordinate axis orthogonal to the z-axis and the x-axis. The y-axis is, for example, a coordinate axis extending in a radial direction centering at the rotation axis of the optical member. The y-axis is parallel to a height direction of the light irradiation device, for example.

In the following embodiments, the optical member rotates in order to change light distribution of irradiation light.

There has been known a light irradiation device that casts light emitted from a light source, forward via two wedge prisms. When each wedge prism is rotated around a rotation axis, the light emitted from the wedge prism changes the direction of the emission. The light emitted from the wedge prisms irradiates a region in a circular region on an irradiation surface.

For example, an illumination device can employ such a configuration of the light irradiation device. The illumination device changes its irradiation direction by scanning a light flux having a large diameter. The illumination device is, for example, a spotlight in a case where the target of irradiation moves. The light source of the illumination device is an LED or the like, for example.

For example, a display device can employ such a configuration of the light irradiation device. The display device performs image formation or information display by scanning a light beam having a small diameter such as a laser beam.

For example, a projection device can employ such a configuration of the light irradiation device. The projection device includes an image display device on its optical path. The image display device corresponds to an image formation unit which will be described later. The projection device projects an image or the like displayed by the image display device. The image display device is, for example, a liquid crystal panel, a light blocking plate in a shape of something such as a symbol, or the like. With such a configuration of the light irradiation device, the projection device is capable of moving a projection image of a symbol, an image or the like. The projection device projects image information onto a road surface, a passage, a wall or the like. Then, the projection device is capable of drawing attention, guiding a passerby, and so forth.

When the projection device is employed for a vehicle, the projection device is capable of projecting an image onto a road surface or the like. Further, the projection device is capable of moving the projected image on the road surface or the like. Accordingly, the projection device is capable of, for example, proving a pedestrian with information suitable for the situation. For example, by projecting an arrow or the like onto the road surface, the projection device is capable of guiding the pedestrian to a position suitable for walking.

For example, a vehicle light fixture can employ such a configuration of the light irradiation device. The vehicle light fixture is, for example, a high beam headlight of an automobile or the like. The high beam is a headlight that is used when the vehicle travels. A lighting distance of the high beam is 100 m, for example. The high beam headlight moves the position of irradiation according to a pedestrian in order to illuminate the pedestrian in front of the traveling vehicle, for example.

The light irradiation device is usable as a vehicle light fixture as a low beam of an automobile or the like. The low beam is a headlight that is used when the vehicle passes by an oncoming vehicle. The lighting distance of the low beam is 30 m, for example. The light irradiation device implements light distribution required of the low beam by scanning the irradiation position at high speed, for example.

Further, the light irradiation device is usable as a vehicle light fixture as a light distribution variable headlight system of an automobile or the like. The light distribution variable headlight system is an ADB (Adaptive Driving Beam) or the like, for example. The ADB extinguishes the light only in a region of dazzling the driver of a vehicle in front so as not to dazzle the driver of the vehicle in front with the high beam at the time of traveling. Further, the ADB irradiates other regions with the high beam and thereby secures visibility and promotes safety.

However, when a mechanism for changing the light irradiation direction is used for a long time, an error can occur to an origin position of the rotating optical member in the rotation direction. Therefore, a light irradiation device having a function of detecting the position of the optical member in the rotation direction is necessary. Further, there is also a request for avoiding complication of the structure of the light irradiation device.

Therefore, in the following embodiments, the description will be given of light irradiation devices capable of detecting the position of the optical member which rotates around a rotation axis in order to change the light distribution of the irradiation light in the rotation direction with a simple configuration.

The following description will be given while regarding a stop position of the optical member as the origin position of the optical member, for example, to facilitate the explanation. However, the position where the optical member is stopped is not limited to the origin position. The origin position is an example of a predetermined stop position of the optical member.

(1) First Embodiment (1-1) Configuration of First Embodiment

FIG. 1 is a diagram schematically showing a configuration of a light irradiation device 1 according to a first embodiment of the present invention. FIG. 2A, FIG. 2B and FIG. 2C are a front view, a side view and a partial top view schematically showing an optical member 20 of the light irradiation device 1 according to the first embodiment.

As shown in FIG. 1, the light irradiation device 1 includes the light source 11, the optical member 20 and a sensor 30. The light irradiation device 1 may include a light source control unit 11b, a lens part 12, a radiator 13, a body tube 14, a gear 31, a gear 32, a motor 33, a motor control unit 34, a body tube 35, a wedge prism 41, a body tube 44 or an image formation unit 90. Further, a drive unit 37 includes the gear 31, the gear 32, the motor 33 and the motor control unit 34, for example.

The light irradiation device 1 is, for example, a device suitable as a headlight as an illumination device of a vehicle. The light irradiation device 1 can be used as an illumination device other than the headlight that changes the light distribution, for example. Incidentally, a structure supporting the light irradiation device 1 is not shown in the drawings.

(1-1-1) Light Source 11

The light source 11 emits light L0. The optical axis AP is the optical axis of the light source 11. The optical axis AP of the light source 11 is an axis extending from a center of a light emission surface 11a of the light source 11 and orthogonal to the light emission surface 11a, for example. Alternatively, the optical axis AP of the light source 11 is a main optical axis, for example. The main optical axis is an optical central axis of the light emitted by the light source, and is generally in a radiation direction of maximum luminosity.

The light source 11 shown in FIG. 1 includes a light-emitting element. The light-emitting element is an LED (Light-Emitting Diode), a laser or the like, for example. The laser includes a semiconductor laser (LD: laser diode). The light source 11 can include a plurality of light-emitting elements.

The light irradiation device 1 can include a drive circuit for driving the light source 11. The light source control unit 11b includes the drive circuit for driving the light source 11, for example. The light source control unit 11b makes adjustment of a light amount of the light source 11. The adjustment of the light amount includes lighting and extinguishing of the light source 11.

(1-1-2) Optical Member 20

The optical member 20 is supported so as to rotate around a rotation axis AR. The rotation axis AR is parallel to the z-axis, for example. The optical member 20 is installed in the body tube 35. The body tube 35 is supported so as to rotate with respect to the body tube 14, for example. Each body tube is a body in a tube-like shape that supports a lens or a prism, blocks external light, and so forth.

Light L1 based on the light L0 emitted from the light source 11 is incident upon the optical member 20. Incidentally, the light L1 is the light L0 when the lens part 12 is not used. Parallel light L1 is incident upon the optical member 20, for example. Light L1 parallel to the z-axis is incident upon the optical member 20, for example. Parallel light is incident upon the optical member 20, for example.

The optical member 20 deflects the incident light L1. The deflected light includes irradiation light L2 and detection light L4. The optical member 20 emits the irradiation light L2. The optical member 20 emits the detection light L4. The optical axis AP and the rotation axis AR are the same axis, for example.

The optical member 20 includes a prism part 21 and a prism part 22.

The prism part 21 is a part that changes an emission direction of the irradiation light L2. The emission direction of the irradiation light L2 is changed by rotation of the optical member 20 in the rotation direction E. The rotation direction E is a circumferential direction of the optical member 20 around the rotation axis AR.

As shown in FIG. 2A and FIG. 2B, the prism part 21 is a wedge prism, for example. The prism part 21 has a surface 21a and a surface 21b. The surface 21a and the surface 21b are arranged to face each other.

The surface 21a is formed on a light incidence surface's side of the optical member 20. The surface 21a is formed on a light incidence surface of the optical member 20, for example. The surface 21a is formed on the light source 11's side of the optical member 20. The surface 21a is a flat surface, for example. The surface 21a has an intersection point with the rotation axis AR.

The surface 21b is formed on a light emission surface's side of the optical member 20. The surface 21b is formed on a light emission surface of the optical member 20, for example. The surface 21b is a flat surface, for example. The surface 21b has an intersection point with the rotation axis AR.

The wedge prism is a prism on which the light emission surface is inclined with respect to the light incidence surface. The wedge prism has an inclined optical surface. One surface of the wedge prism is inclined with respect to another surface by a small angle. The inclination angle of the one surface of the wedge prism with respect to the other surface is referred to as a wedge angle or an apical angle.

The light entering the wedge prism is refracted at an angle corresponding to the inclination angle of the wedge prism and is emitted. The light entering the wedge prism is refracted toward a direction in which the thickness of the prism increases. The light entering the wedge prism is deflected toward the direction in which the thickness of the prism increases. The angle of the light emitted from the wedge prism with respect to the light entering the wedge prism is referred to as a deflection angle.

Incidentally, in the following embodiments, one surface of the wedge prism is assumed to be a surface orthogonal to the rotation axis. However, it is permissible even if the two surfaces of the wedge prism are surfaces inclined with respect to the rotation axis. Namely, the light incidence surface and the light emission surface of the wedge prism may be surfaces inclined with respect to the rotation axis.

The surface 21a and the surface 21b are surfaces inclined with respect to each other. The surface 21a is inclined with respect to the surface 21b. The surface 21a is inclined with respect to the rotation axis AR. In FIG. 1 and FIG. 2B, the surface 21a is parallel to the x-axis and inclined with respect to the y-axis. The surface 21b is a surface orthogonal to the rotation axis AR, for example. The surface 21b is parallel to both of the x-axis and the y-axis. The thickness of the prism part 21 is greater on the −y-axis side than on the +y-axis side. Therefore, the light entering the prism part 21 is deflected towards the −y-axis side.

The light L1 is incident upon the surface 21a. The light L1 incident upon the surface 21a is light parallel to the z-axis, for example. The light L1 incident upon the surface 21a is light parallel to the rotation axis AR, for example. The light L1 is refracted at the surface 21a. The light L1 refracted at the surface 21a is refracted at the surface 21b. The light L1 refracted at the surface 21b is emitted from the surface 21b as the irradiation light L2. The irradiation light L2 is light inclined with respect to the rotation axis AR. The irradiation light L2 is light inclined with respect to the z-axis.

A traveling direction of the irradiation light L2 changes depending on the position of the optical member 20 in the rotation direction E. In other words, the light distribution of the irradiation light L2 changes depending on the position of the optical member 20 in the rotation direction E.

However, it is permissible even if the surface 21a is a surface orthogonal to the rotation axis AR and the surface 21b is a surface inclined with respect to the rotation axis AR. In other words, it is permissible even if the surface 21a is a surface parallel to both of the x-axis and the y-axis and the surface 21b is a surface parallel to the x-axis and inclined with respect to the y-axis. In this case, the light L1 parallel to the z-axis is perpendicularly incident upon the surface 21a. The light L1 parallel to the rotation axis AR is perpendicularly incident upon the surface 21a. After entering the prism part 21 through the surface 21a, the light L1 is refracted at the surface 21b. The light L1 refracted at the surface 21b is emitted from the surface 21b as the irradiation light L2. The irradiation light L2 is light inclined with respect to the rotation axis AR. The irradiation light L2 is light inclined with respect to the z-axis.

The prism part 22 extracts the detection light L4 from the light L1 that entered the optical member 20. The prism part 22 is a prism for the detection light.

The prism part 22 is formed on an outer circumferential side of the optical member 20 around the rotation axis AR. The prism part 22 is formed in an outer circumferential part of the optical member 20 around the rotation axis AR. The prism part 22 is famed on a part of the prism part 21 having a small thickness, for example. The prism part 22 is formed on a part of the prism part 21 having a thickness smaller than an average wall thickness of the prism part 21, for example. The prism part 22 is formed on a part of the prism part 21 having the smallest thickness, for example.

As shown in FIG. 2A and FIG. 2B, the prism part 22 has a surface 22a and a surface 22b. The surface 22a and the surface 22b are arranged to face each other.

The surface 22a is formed on the light incidence surface's side of the optical member 20. The surface 22a is formed on the light incidence surface of the optical member 20, for example. The surface 22a is formed on the light source 11's side of the optical member 20. The surface 22a is a flat surface, for example.

The surface 22b is formed on the light emission surface's side of the optical member 20. The surface 22b is formed on the light emission surface of the optical member 20, for example. The surface 22b is on the same surface as the surface 21b, for example. As shown in FIG. 2B, the surface 22b forms the same surface with the surface 21b. The surface 22b is a flat surface, for example.

The surface 22a and the surface 22b are surfaces inclined with respect to each other. The surface 22a is inclined with respect to the surface 22b. The surface 22a is inclined with respect to the rotation axis AR. In FIG. 1 and FIG. 2B, the surface 22a is parallel to the x-axis and inclined with respect to the y-axis. As shown in FIG. 2B, the surface 22a is inclined in an opposite direction compared to the surface 21a. The surface 22b is a surface orthogonal to the rotation axis AR, for example. The surface 22b is parallel to both of the x-axis and the y-axis.

In the direction of the rotation axis AR, an outer circumferential side of the surface 22a around the rotation axis AR is situated on the light source 11's side compared to an inner circumferential side of the surface 22a. In the direction of the rotation axis AR, the outer circumferential side of the surface 22a around the rotation axis AR projects towards the side from which the light L1 is incident compared to the inner circumferential side of the surface 22a. The side from which the light L1 is incident is the −z-axis direction side. In other words, in the direction of the rotation axis AR, the outer circumferential side of the surface 22a around the rotation axis AR projects towards an upstream side in the traveling direction of the light L1 (the −z-axis direction side) compared to the inner circumferential side of the surface 22a. The outer circumferential side of the surface 22a around the rotation axis AR projects in a direction (−z-axis direction) opposite to the incidence direction of the light L1 (+z-axis direction) compared to the inner circumferential side of the surface 22a.

As shown in FIG. 1, the light L1 is light parallel to the z-axis, for example. The light L1 is light parallel to the rotation axis AR, for example. The light L1 is incident upon the surface 22a. The light L1 is refracted at the surface 22a. The light L1 is refracted at the surface 22a of the prism part 22. The light L1 is refracted towards the outer circumferential side of the optical member 20 around the rotation axis AR.

The light L1 refracted at the surface 22a is reflected by the surface 22b. The light L1 refracted at the surface 22a undergoes total reflection by the surface 22b, for example. The light L1 refracted at the surface 22a is reflected towards the outer circumferential side of the optical member 20 around the rotation axis AR. The light L1 reflected by the surface 22b travels towards the outer circumferential side of the optical member 20. The light L1 is reflected by the surface 22b and travels towards a light guide part 23.

The light L1 reflected by the surface 22b enters the light guide part 23 as the detection light L4. The light L1 passes through the light guide part 23 and is emitted. The light L1 is emitted as the detection light L4. The light L1 passes through the light guide part 23 and is emitted from a light emission end part 24 and a light emission end part 25 as the detection light L4.

However, the prism part 22 may also be configured to have a surface 22a parallel to both of the x-axis and the y-axis and a surface 22b parallel to the x-axis and inclined with respect to the y-axis. In this case, the light L1 parallel to the z-axis enters the prism part 22 through the surface 22a. Thereafter, the light L1 is reflected by the surface 22b and travels towards the light guide part 23. The light L1 passes through the light guide part 23 and is emitted. The light L1 is emitted as the detection light L4. The light L1 passes through the light guide part 23 and is emitted from the light emission end part 24 and the light emission end part 25 as the detection light L4.

Further, by narrowing the area of the prism part 22, ill effect on the light distribution of irradiation light L3 can be reduced. Further, by limiting the region of the prism part 22 to the outer circumferential side of the optical member 20 around the rotation axis AR, the ill effect on the light distribution of the irradiation light L3 can be reduced. Here, the ill effect is, for example, disappearance of a part of the light distribution of the irradiation light L2 or the like.

The prism part 21, the prism part 22 and the light guide part 23 are formed integrally, for example. The material of the prism part 21, the prism part 22 and the light guide part 23 is transparent material. The transparent material is, glass or plastic, for example. The material of the prism part 21, the prism part 22 and the light guide part 23 is material that lets light through, for example.

The light guide part 23 guides the detection light L4 deflected by the prism part 22. The detection light L4 exiting from the prism part 22 enters the light guide part 23. The light guide part 23 guides the detection light L4 exiting from the prism part 22. The light guide part 23 is provided outside the prism part 22 in the radial direction centering at the rotation axis AR. The light guide part 23 guides the detection light L4 deflected by the prism part 22 outward in the radial direction centering at the rotation axis AR. To "guide light" means to guide and transmit the light.

The light guide part 23 is in a rod-like shape, for example. A cross section of the light guide part 23 is, for example, in a circular shape, a rectangular shape or the like. The detection light L4 entering the light guide part 23 is reflected by a side face of the light guide part 23. The detection light L4 entering the light guide part 23 is guided by being reflected by the side face of the light guide part 23. The reflection at the side face of the light guide part 23 is total reflection, for example. The light guide part 23 is arranged to penetrate an opening 36, for example.

As shown in FIG. 2A to FIG. 2C, the light guide part 23 can include the light emission end part 24 and the light emission end part 25. The light emission end part 24 and the light emission end part 25 are arranged side by side in the rotation direction E of the optical member 20. The light emission end part 24 and the light emission end part 25 are arranged side by side in the circumferential direction of the optical member 20. The light emission end part 24 and the light emission end part 25 are arranged side by side in the circumferential direction of the optical member 20 around the rotation axis AR. The light emission end part 24 and the light emission end part 25 face outward in the radial direction of the optical member 20 centering at the rotation axis AR. Incidentally, the light guide part 23 may also be configured to have only one light emission end part.

The detection light L4 deflected by the prism part 22 travels in the light guide part 23. The detection light L4 that traveled in the light guide part 23 diverges into the light emission end part 24 and the light emission end part 25. The detection light L4 that entered the light guide part 23 enters the light emission end parts 24 and 25 through light incidence parts 24b and 25b. The detection light L4 that entered the light emission end parts 24 and 25 respectively travels in the light emission end parts 24 and 25. The detection light L4 that traveled in the light emission end parts 24 and 25 is emitted from light emission surfaces 24a and 25a. The detection light L4 includes detection light L41 and detection light L42. The detection light L4 after being split is emitted from the light emission end part 24 as the detection light L41. The detection light L41 is emitted from the light emission end part 24. The detection light L4 after being split is emitted from the light emission end part 25 as the detection light L42. The detection light L42 is emitted from the light emission end part 25.

As shown in FIG. 2A and FIG. 2C, a gap is formed between the light emission end part 24 and the light emission end part 25. The gap is formed with a notch or the like, for example. The gap is a notch part, for example. In the example of FIG. 2A to FIG. 2C, a notch in the shape of a V-shaped groove is formed between the light emission end part 24 and the light emission end part 25.

Further, in the example of FIG. 2A to FIG. 2C, the light guide part 23 is famed so that the light amount of the detection light L41 emitted from the light emission end part 24 and the light amount of the detection light L42 emitted from the light emission end part 25 are equal to each other. In short, the light amount of the detection light L41 and the light amount of the detection light L42 are equal.

In the circumferential direction of the optical member 20, a dimension from an outer end of the light emission surface 24a of the light emission end part 24 to an outer end of the light emission surface 25a of the light emission end part 25 is defined as a length W1. A dimension of the light emission surface 24a, 25a of the light emission end part 24, 25 in the z-axis direction is defined as a width D1. The dimension of the light emission surface 24a, 25a in the z-axis direction is a dimension in a thickness direction of the optical member 20.

In the example of FIG. 2A to FIG. 2C, the length W1 and the width D1 of the light emission end parts of the light guide part 23 are equal to a length and a width of a photoreception part 30b of the sensor 30. The length W1 and the width D1 of the light emission end parts of the light guide part 23 may also be set smaller than the dimensions of the photoreception part 30b of the sensor 30. In other words, the length W1 and the width D1 of the light emission end parts of the light guide part 23 may be designed so that the light emission end parts fit in the range of a photoreception region of the sensor 30.

Incidentally, in cases like guiding the detection light L4 to the sensor 30 by using an optical fiber or the like, for example, the photoreception part 30b of the sensor 30 is a part of the optical fiber or the like through which the detection light L4 enters the optical fiber or the like.

The optical member 20 can include the light guide part 23. However, the optical member 20 can also be configured to include no light guide part 23. Examples of such an optical member including no light guide part 23 will be described later in a second embodiment (FIG. 11) and a third embodiment (FIG. 13).

As shown in FIG. 1, the light guide part 23 is arranged to penetrate the opening 36. The opening 36 is famed through a side face of the body tube 35.

(1-1-3) Sensor 30

The sensor 30 receives the detection light L4. The sensor 30 detects the light amount of the detection light L4. The detection of the light amount of the detection light L4 includes detection of whether the detection light L4 is received by the sensor 30 or not. The detection of the light amount of the detection light L4 includes detection of a change in a light reception amount of the detection light L4 received by the sensor 30.

The sensor 30 receives the detection light L4 deflected by the prism part 22. The light reception amount of the detection light L4 received by the sensor 30 changes depending on the position of the optical member 20 in the rotation direction E. The light amount of light received by the sensor 30 changes depending on the position of the optical member 20 in the rotation direction E. The light amount of the detection light L4 received by the sensor 30 changes depending on the position of the light guide part 23 in the rotation direction E.

The sensor 30 detects the position of the optical member 20 in the rotation direction E by receiving the deflected detection light L4. The sensor 30 is capable of detecting the origin position of the optical member 20 in the rotation direction E, for example. The origin position is determined based on the light reception amount of the sensor 30, for example.

The sensor 30 is an optical sensor, for example. The sensor 30 is, for example, a photodiode, a phototransistor or the like. The sensor 30 transduces light into an electric signal. In general, the sensor 30 has electrical performance capable of detecting illuminance in a range of approximately 0.1 lx to 1000 lx.

(1-1-4) Lens Part 12

The lens part 12 transforms the light L0 to the light L1. The light L0 is the light emitted from the light source 11. The light L0 travels in the +z-axis direction. The light L1 travels in the +z-axis direction. The light L1 is the light entering the optical member 20.

The lens part 12 condenses light, for example. The lens part 12 is a condensing lens, for example. A divergence angle of the light L1 emitted from the lens part 12 is smaller than a divergence angle of the light L0 incident upon the lens part 12. The light L1 is parallel light, for example. To "condense light" means to collect a light beam to one position or one direction.

In cases where an image is projected by using the image formation unit 90 or the like, the lens part 12 is a projection lens. Here, the image includes a light distribution pattern. The focal point of the lens part 12 is situated on an image surface formed by the image formation unit 90, for example.

The lens part 12 is a lens or a lens set. The lens set includes a plurality of lenses.

An optical axis AC is the optical axis of the lens part 12. The optical axis AC and the rotation axis AR are the same axis, for example. The optical axis AC and the optical axis AP are the same axis, for example.

(1-1-5) Drive Unit 37

The drive unit 37 includes the motor 33, the motor control unit 34, the gear 32 and the gear 31. The drive unit 37 rotates the optical member 20.

The motor 33 is a stepping motor, a DC (direct current) motor or the like, for example. For example, the gear 32 is attached to a shaft of the motor 33. When the shaft of the motor 33 rotates, the gear 32 rotates. The motor 33 rotates the gear 32.

The motor control unit 34 controls the rotation, stoppage, rotation direction, rotation speed, etc. of the motor 33. The motor control unit 34 includes a circuit that drives the motor 33, for example.

The gear 32 transmits turning force of the motor 33 to the gear 31. The gear 32 is attached to the shaft of the motor 33, for example. The gear 32 is engaged with the gear 31.

The gear 31 is provided on the body tube 35, for example. The gear 31 is provided on an outer circumferential part of the body tube 35. The gear 31 is provided on an outer circumference of the body tube 35. The body tube 35 is rotated by the turning force transmitted from the gear 32 to the gear 31. The optical member 20 is rotated by the rotation of the body tube 35. It is also possible to provide the gear 31 on an outer circumferential part of the optical member 20, for example. The optical member 20 is rotated by the turning force transmitted from the gear 32 to the gear 31.

(1-1-6) Wedge Prism 41

As shown in FIG. 1, the light irradiation device 1 may include the wedge prism 41. The irradiation light L2 is incident upon the wedge prism 41. The wedge prism 41 is an optical member upon which the irradiation light L2 is incident. The irradiation light L2 is the light emitted from the optical member 20.

The wedge prism 41 has a light incidence surface 42 and a light emission surface 43. The light incidence surface 42 and the light emission surface 43 are arranged to face each other. The light incidence surface 42 is formed on the optical member 20's side. The light incidence surface 42 is a flat surface, for example. The light emission surface 43 is a flat surface, for example.

The light incidence surface 42 and the light emission surface 43 are surfaces inclined with respect to each other. The light incidence surface 42 is orthogonal to the optical axis AP, for example. The light incidence surface 42 is parallel to both of the x-axis and the y-axis. The light emission surface 43 is inclined with respect to the light incidence surface 42. The light emission surface 43 is inclined with respect to the optical axis AP, for example. In FIG. 1, the light emission surface 43 is parallel to the x-axis and inclined with respect to the y-axis. The optical axis AP is the optical axis of the light source 11. The thickness of the wedge prism 41 is greater on the +y-axis side than on the −y-axis side. Therefore, the light entering the wedge prism 41 is deflected towards the +y-axis side.

The irradiation light L2 is refracted at the light incidence surface 42. The irradiation light L2 refracted at the light incidence surface 42 is refracted at the light emission surface 43. The irradiation light L2 refracted at the light emission surface 43 is emitted from the light emission surface 43 as the irradiation light L3. The irradiation light L3 is light inclined with respect to the z-axis. The irradiation light L3 is light inclined with respect to the optical axis AP, for example. The irradiation light L3 is light inclined with respect to the optical axis AC, for example. The irradiation light L3 is light inclined with respect to the rotation axis AR, for example.

The wedge prism 41 changes the traveling direction of the irradiation light L2 and thereby emits the irradiation light L3. Specifically, the traveling direction of the irradiation light L3 is determined by the positional relationship between the prism part 21 of the optical member 20 and the wedge prism 41. The traveling direction of the irradiation light L3 is determined by a deflection direction of the prism part 21 of the optical member 20 and a deflection direction of the wedge prism 41. The light distribution of the irradiation light L3 includes the traveling direction of the irradiation light L3.

Incidentally, it is permissible even if the light emission surface 43 is a surface parallel to both of the x-axis and the y-axis and the light incidence surface 42 is a surface parallel to the x-axis and inclined with respect to the y-axis. In other words, it is permissible even if the light incidence surface 42 of the wedge prism 41 is inclined with respect to the optical axis AP and the light emission surface 43 of the wedge prism 41 is orthogonal to the optical axis AP.

Further, the wedge prism 41 can be rotated similarly to the optical member 20. A rotation axis of the wedge prism 41 and the rotation axis AR are the same axis, for example. The rotation axis of the wedge prism 41 and the optical axis AP are the same axis, for example. The rotation axis of the wedge prism 41 and the optical axis AC are the same axis, for example.

The shapes, the number and the positions of other optical members for changing the light distribution of the irradiation light L2 are not limited to the illustrated example of the wedge prism 41.

(1-1-7) Radiator 13 and Body Tubes 14, 35 and 44

The radiator 13 holds the light source 11, for example. The radiator 13 radiates heat generated in the light source 11.

The body tube 14 is a body tube that does not rotate. The body tube 14 is attached to the radiator 13, for example. The body tube 14 holds the lens part 12, for example.

The body tube 35 holds the optical member 20. The body tube 35 rotates around the rotation axis AR. The body tube 35 is held so as to rotate around the rotation axis AR. The body tube 35 is supported so as to rotate with respect to the body tube 14, for example. The body tube 35 is supported so as to rotate with respect to the body tube 44, for example. The body tube 35 is supported so as to rotate with respect to the light source 11, for example.

The optical member 20 is rotated by the rotation of the body tube 35. The optical member 20 rotates around the rotation axis AR.

The body tube 35 has the opening 36. The body tube 35 has the opening 36 in its side face.

Incidentally, it is also possible to form the opening 36 with a light transmissive member. The light transmissive member is a material that lets light through. In this case, the light guide part 23 is not arranged to penetrate the opening 36. The light emission end parts 24 and 25 of the light guide part 23 are arranged to face an inner surface of the opening 36. The light emission surfaces 24a and 25a of the light emission end parts 24 and 25 are arranged to face the inner surface of the opening 36.

The body tube 44 holds the wedge prism 41. The body tube 44 is held by the body tube 14, for example. The body tube 44 is fixed to the body tube 14, for example. The body tube 44 is held by the radiator 13, for example. The body tube 44 is fixed to the radiator 13, for example.

The body tube 44 is a body tube that does not rotate. However, the body tube 44 may also be a body tube that rotates. In this case, the body tube 44 may be held by the body tube 35, for example.

The body tube 44 has an opening 45. The body tube 44 has the opening 45 in its side face.

The position of the opening 45 in the z-axis direction is the same as the position of the opening 36 in the z-axis direction. The position of the opening 45 in the direction of the rotation axis AR is the same as the position of the opening 36 in the direction of the rotation axis AR. The body tube 35 is rotated with respect to the body tube 44. Then, the position of the opening 45 in the circumferential direction and the position of the opening 36 in the circumferential direction are made to coincide with each other. The opening 45 is situated at a position facing the opening 36. The position where the opening 45 and the opening 36 face each other is the origin position, for example.

In this case, the detection light L4 emitted from the light guide part 23 passes through the opening 45 and reaches the sensor 30. Namely, the detection light L4 emitted from the light emission end part 24 and the light emission end part 25 passes through the opening 45 and enters the photoreception part 30b of the sensor 30. Here, the detection light L4 is the light deflected by the prism part 22 and emitted from the light guide part 23.

Further, it is also possible to form the opening 45 with a light transmissive member. In this case, the light emission end parts 24 and 25 of the light guide part 23 are arranged to face an inner surface of the opening 45. The light emission surfaces 24a and 25a of the light emission end parts 24 and 25 are arranged to face the inner surface of the opening 45. In this case, the detection light L4 emitted from the light guide part 23 passes through the opening 36 and the opening 45 and reaches the sensor 30. Namely, the detection light L4 emitted from the light emission end part 24 and the light emission end part 25 passes through the opening 36 and the opening 45 and enters the photoreception part 30b of the sensor 30. The detection light L4 deflected by the prism part 22 passes through the opening 36 and enters the photoreception part 30b of the sensor 30. The detection light L4 deflected by the prism part 22 passes through the opening 45 and enters the photoreception part 30b of the sensor 30.

(1-1-8) Image Formation Unit 90

The light irradiation device 1 can be a projection device that projects an image. In this case, the lens part 12 projects an image. The lens part 12 may project an image while magnifying the image, for example. Namely, the lens part 12 is a projection lens.

The image to be projected is an image formed based on the light emission surface 11a of the light source 11, for example. The image formed based on the light emission surface 11a of the light source 11 can include an image in which the shape and luminance distribution of the light emission surface have been changed. Further, the image to be projected is a light distribution pattern famed by the light emitted from the light source 11, for example. This light distribution pattern can include a pattern in which the light distribution of the light emitted from the light source 11 has been changed.

The image formation unit 90 forms the image to be projected. For example, the lens part 12 projects the image famed by the image formation unit 90. The image formation unit 90 is arranged between the light source 11 and the lens part 12. The image formation unit 90 is arranged at the focal position of the lens part 12, for example. The lens part 12 projects the image famed by the image formation unit 90.

The image is the shape of an object that is seen by an eye. The image is a reflection or the like, for example. The reflection is an image formed by refraction, reflection or the like of rays of light. The reflection can include motion video and a still image. The image can include a light distribution pattern.

The image formation unit 90 is a light blocking plate, for example. The light blocking plate has a hole in the shape of an arrow or the like, for example. The arrow shape famed by the light blocking plate is projected by the lens part 12.

The image formation unit 90 is a liquid crystal panel, for example. In this case, motion video or the like famed by the image formation unit 90 is projected by the lens part 12.

(1-2) Operation of First Embodiment (1-2-1) Origin Position Detection Operation

FIG. 3A to FIG. 3C are diagrams showing the positional relationship between the light guide part 23 of the optical member 20 and the sensor 30 in the light irradiation device 1 according to the first embodiment. FIG. 3A to FIG. 3C show positions P1, P2 and P3 when the optical member 20 rotates around the rotation axis AR. The positions P1, P2 and P3 are positions of the light emission end part 24 and the light emission end part 25 in the rotation direction E with respect to the sensor 30. The rotation direction E is the rotation direction of the optical member 20 around the rotation axis AR.

FIG. 3A shows the position P1 in the rotation direction E. FIG. 3B shows the position P2 in the rotation direction E. FIG. 3C shows the position P3 in the rotation direction E.

FIG. 4 is a diagram showing the relationship between the positions P1, P2 and P3 and the light amount of the detection light L4 received by the sensor 30. FIG. 4 is a diagram showing the light reception amount of the sensor 30 at the positions P1, P2 and P3. The detection light L4 includes the detection light L41 and the detection light L42. Incidentally, the light reception amount of the sensor 30 shown in FIG. 4 is the light reception amount of the light emitted from the light guide part 23.

At the position P1, neither the light emission end part 24 nor the light emission end part 25 faces the sensor 30. Therefore, neither the detection light L41 emitted from the light emission end part 24 nor the detection light L42 emitted from the light emission end part 25 reaches the sensor 30. In this case, the level of a signal representing the light reception amount of the sensor 30 is zero.

At the position P2, the light emission end part 24 faces the sensor 30 and the light emission end part 25 does not face the sensor 30. Therefore, the detection light L41 emitted from the light emission end part 24 reaches the sensor 30. However, the detection light L42 emitted from the light emission end part 25 does not reach the sensor 30. In this case, the level of the signal representing the light reception amount of the sensor 30 is R. R equals the level of a signal representing the light amount of the detection light L41 emitted from the light emission end part 24.

In FIG. 3A to FIG. 3C, the light amount of the detection light L41 emitted from the light emission end part 24 and the light amount of the detection light L42 emitted from the light emission end part 25 are equal to each other. Therefore, even when the optical member 20 rotates in the opposite direction, the level of the signal representing the light reception amount of the sensor 30 is R in a state corresponding to the position P2. Here, the "state corresponding to the position P2" means a state in which the light emission end part 25 faces the sensor 30 and the light emission end part 24 does not face the sensor 30.

At the position P3, both of the light emission end part 24 and the light emission end part 25 face the sensor 30. Therefore, both of the detection light L41 emitted from the light emission end part 24 and the detection light L42 emitted from the light emission end part 25 reach the sensor 30. In this case, the level of the signal representing the light reception amount of the sensor 30 is 2R. 2R is twice R.

For example, the case where the level of the signal representing the light reception amount of the sensor 30 is 2R is considered to correspond to the origin position of the optical member 20. The light irradiation device 1 is capable of obtaining the signal level R before obtaining the signal level 2R at the origin position. Therefore, even when the optical member 20 is rotated at high speed, it is possible to reduce the rotation speed of the optical member 20 and stop the optical member 20 after obtaining the signal level R. For example, the operation of detecting the origin position and stopping the optical member 20 is an example of a positioning operation of the optical member 20.

(1-2-2) Light Amount Control when Detecting Origin Position

In the light irradiation device 1, the light L1 entering the prism part 22 is guided to the sensor 30. The light L1 entering the prism part 22 is, for example, light entering a peripheral part of the optical member 20. The peripheral part of the optical member 20 is situated at a periphery of the optical member 20 around the rotation axis AR. By actively guiding the light L1 entering the optical member 20 to the sensor 30 as above, the detection of the position of the optical member 20 in the rotation direction E is facilitated even when the luminance of the light source 11 is lowered, for example. In other words, it becomes easy to detect the position of the optical member 20 in the rotation direction E while lowering the light amount of the light source 11. For example, the light reception amount of the sensor 30 can be increased compared to systems in which stray light in the body tube 35 is guided to the sensor 30. The stray light in the body tube 35 leaks to the outside of the body tube 35 through the opening 36. The stray light leaking to the outside of the body tube 35 is received by the sensor 30.

The light irradiation device 1 is capable of lowering the light amount at the time of returning the optical member 20 to the origin position in comparison with the light amount at the time of irradiating an irradiation object with light. For example, if the operation of returning the optical member 20 to the origin position is performed with the light amount at the time of irradiating the irradiation object with light, the irradiation light L3 shows an unexpected movement on the irradiation surface. This unexpected movement of the irradiation light L3 can lead to occurrence of an accident or the like. For example, the light irradiation device 1 erroneously guides a passerby. For example, the light irradiation device 1 dazzles the driver of a vehicle in front.

The light irradiation device 1 is capable of performing the operation of returning the optical member 20 to the origin position with a small light amount. Accordingly, the light irradiation device 1 is capable of reducing the light amount of the irradiation light L3 at the time of returning the optical member 20 to the origin position. The light irradiation device 1 reduces the light amount of the light L0 emitted from the light source 11 at the time of the positioning operation of the optical member 20. The light irradiation device 1 reduces the light amount of the irradiation light L3 at the time of the positioning operation of the optical member 20. Then, the light irradiation device 1 is capable of reducing the influence of the unexpected movement of the irradiation light L3 on the irradiation surface. Here, the positioning of the optical member 20 is positioning of the optical member 20 to the position as the reference of the rotating operation of the optical member 20.

(1-3) Effect of First Embodiment

First, the light irradiation device 1 is capable of detecting the position of the optical member 20 in the rotation direction E by using the light L0 emitted by the light source 11. Therefore, the light irradiation device 1 does not need a light-emitting element for the detection of the position of the optical member 20 in the rotation direction E. As above, the light irradiation device 1 is capable of detecting the position of the optical member 20 in the rotation direction E with a simple configuration. The position of the optical member 20 in the rotation direction E is, for example, the stop position of the optical member 20. The position of the optical member 20 in the rotation direction E is the stop position of stopping the optical member 20 at the position as the reference.

Second, the light irradiation device 1 is capable of rotating the optical member 20 at high speed until the level of the signal outputted from the sensor 30 reaches R. Accordingly, the light irradiation device 1 is capable of shortening the detection time of the origin position of the optical member 20 in the rotation direction E.

Third, the light irradiation device 1 rotates the optical member 20 at low speed after the level of the signal outputted from the sensor 30 reaches R. Accordingly, the light irradiation device 1 is capable of increasing the accuracy of the stop position of the optical member 20 in the rotation direction E. Namely, the light irradiation device 1 is capable of increasing the accuracy of the origin position of the optical member 20. The origin position is the position as the reference.

For example, in cases where the motor 33 is a stepping motor, the high speed rotation until the signal level reaches R is performed in the slew range of the stepping motor. Then, the low speed rotation after the signal level reaches R is performed in the self-start range of the stepping motor.

The slew range is a range in which a synchronous operation is possible when the stepping motor is driven at high speed. The driving in the slew range uses slow-up slow-down control in which the stepping motor is first started in the self-start range and the pulse speed is gradually raised. The self-start range is a region in which control of starting, normal rotation or reverse rotation is possible in sync with a pulse signal inputted from the outside.

Fourth, in the light irradiation device 1, the prism part 22 is provided on the light incidence surface's side of the optical member 20. Namely, it is unnecessary to provide a projection part on the light emission surface's side of the optical member 20. Therefore, the clearance between the optical member 20 and the wedge prism 41 can be narrowed. With this configuration, unnecessary light can be reduced. Further, utilization efficiency of the light emitted as the irradiation light L3 can be increased. Here, the unnecessary light means light emitted from the optical member 20 and not entering the wedge prism 41.

Fifth, the light irradiation device 1 employs the optical member 20 including the light guide part 23. With this configuration, an emission region for the detection light L4 emitted from the prism part 22 can be made small. Here, the emission region for the detection light L4 is the light emission surface(s) of the light guide part 23. In the first embodiment, the light emission surfaces 24a and 25a of the light emission end parts 24 and 25 are shown as an example. However, it is unnecessary to provide the light guide part 23 with separate light emission end parts. In other words, it is permissible even if the light guide part 23 has only one light emission end part.

Accordingly, the sizes of the opening 36 and the opening 45 can be made small. With this configuration, in the detection light L4 emitted from the prism part 22, light not entering the sensor 30 can be reduced. In other words, photoreception efficiency of the sensor 30 can be increased. Further, detection accuracy of the position of the optical member 20 in the rotation direction E can be increased. Namely, detection accuracy of the origin position of the optical member 20 can be increased.

Sixth, by including the prism part 22, the light irradiation device 1 is capable of performing the operation of returning the optical member 20 to the origin position with a small light amount. Further, the light irradiation device 1 is capable of reducing the influence of the unexpected movement of the irradiation light L3 on the irradiation surface.

(1-4) First Modification of First Embodiment

FIG. 5A and FIG. 5B are a front view and a side view schematically showing an optical member 50 of a light irradiation device according to a first modification of the first embodiment. FIG. 6 is a front view schematically showing a light guide part 53 of the optical member 50 shown in FIG. 5A. The light irradiation device according to the first modification differs from the light irradiation device 1 shown in FIG. 1 to FIG. 4 in shapes of light emission end parts of the light guide part 53 of the optical member 50. Except for these features, the light irradiation device according to the first modification of the first embodiment is the same as the light irradiation device 1 shown in FIG. 1 to FIG. 4. Each component identical to a component of the light irradiation device 1 is assigned the same reference character as in the light irradiation device 1 and descriptions of these components are omitted.

Components 51, 51a and 51b respectively correspond to the components 21, 21a and 21b. Components 52, 52a and 52b respectively correspond to the components 22, 22a and 22b. In regard to these components, the description of the light irradiation device 1 is substituted for description of the first modification.

The light guide part 53 corresponds to the light guide part 23. The structure of light emission end parts 54, 55 and 56 of the light guide part 53 differs from the structure of the light emission end parts 24 and 25 of the light guide part 23. In regard to other features of the light guide part 53, the description of the light guide part 23 is substituted for description of the light guide part 53.

As shown in FIG. 5A and FIG. 6, the light guide part 53 includes the light emission end part 54, the light emission end part 55 and the light emission end part 56. The light emission end part 54 emits detection light L41a. The light emission end part 55 emits detection light L42a. The light emission end part 56 emits detection light L43a. A light emission surface 54a of the light emission end part 54, a light emission surface 55a of the light emission end part 55 and a light emission surface 56a of the light emission end part 56 differ from each other in the area. The area of the light emission surface 54a, 55a, 56a is the area of a region emitting the detection light L41a, L42a, L43a.

The light amounts of the detection light L41a, the detection light L42a and the detection light L43a emitted from the light emission end part 54, the light emission end part 55 and the light emission end part 56 differ from each other. In FIG. 5A and FIG. 6, the light guide part 53 is formed so that the ratio among the light amounts of the detection light L41a, the detection light L42a and the detection light L43a emitted from the light emission end part 54, the light emission end part 55 and the light emission end part 56 is 1:3:2, for example. The light amount of the detection light L43a is twice the light amount of the detection light L41a, for example. The light amount of the detection light L42a is three times the light amount of the detection light L41a, for example.

Figure 7B:
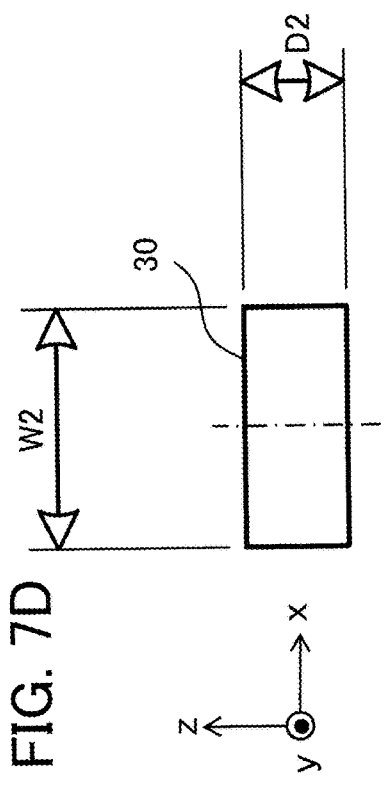
FIGS. 7A and 7B are diagrams showing a positional relationship between the light guide part of the optical member and the optical sensor shown in FIG. 5A, and FIGS. 7C and 7D are diagrams showing another positional relationship between the light guide part of the optical member and the optical sensor shown in FIG. 5A.
Figure 7A:
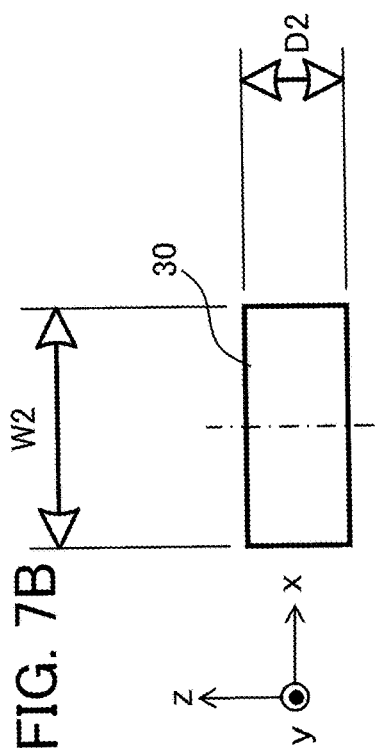
Figure 7D:
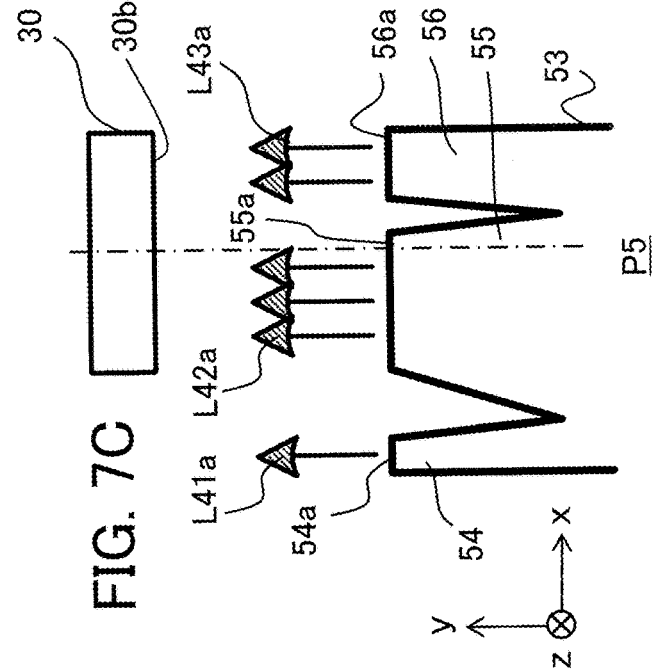
Figure 7C:
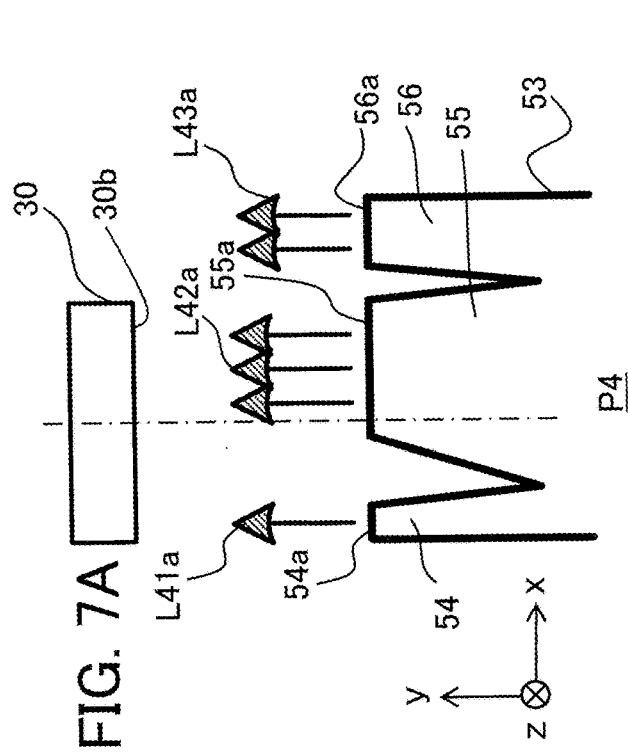

FIG. 7A and FIG. 7C are diagrams showing a positional relationship between the light guide part 53 of the optical member 50 and the sensor 30 shown in FIG. 5A. FIG. 7B and FIG. 7D are diagrams showing the shape of the photoreception part 30b of the sensor 30 shown in FIG. 5A.

FIG. 7A shows a case of a position P4. At the position P4, the light emission end part 54 and the light emission end part 55 face the photoreception part 30b of the sensor 30. FIG. 7C shows a case of a position P5. At the position P5, the light emission end part 55 and the light emission end part 56 face the photoreception part 30b of the sensor 30.

For example, a range of a light emission surface of a light emission end part, as the light emission surface 54a of the light emission end part 54 and the light emission surface 55a of the light emission end part 55 combined together, is a range in a rectangular shape having a length W2 in the circumferential direction of the optical member 50 and a length D2 in the z-axis direction. The length D2 is a length in the thickness direction of the optical member 50. Similarly, a range of a light emission surface of a light emission end part, as the light emission surface 55a of the light emission end part 55 and the light emission surface 56a of the light emission end part 56 combined together, is a range in a rectangular shape having the length W2 in the circumferential direction of the optical member 50 and the length D2 in the z-axis direction.

Further, the range in the rectangular shape coincides with the range of the photoreception part 30b of the sensor 30, for example. The range of the photoreception part 30b of the sensor 30 is a range in a rectangular shape having the length W2 in a direction corresponding to the circumferential direction of the optical member 50 and the length D2 in the z-axis direction. The length in the direction corresponding to the circumferential direction of the optical member 50 is the length in the x-axis direction in the diagrams.

When the light emission end part 54 and the light emission end part 55 face the photoreception part 30b of the sensor 30 as shown in FIG. 7A and FIG. 7B, a light amount I1 is received. The light amount I1 is the sum of the light amount of the detection light L41a emitted from the light emission end part 54 and the light amount of the detection light L42a emitted from the light emission end part 55.

When the light emission end part 55 and the light emission end part 56 face the photoreception part 30b of the sensor 30 as shown in FIG. 7C and FIG. 7D, a light amount I2 is received. The light amount I2 is the sum of the light amount of the detection light L42a emitted from the light emission end part 55 and the light amount of the detection light L43a emitted from the light emission end part 56.

In the case where the ratio among the light amounts of the detection light L41a, the detection light L42a and the detection light L43a is 1:3:2, I1:I2=4:5 holds. Namely, the light amount I2 is 1.25 times the light amount I1.

The light irradiation device according to the first modification sets the value of the light amount I1 and the value of the light amount I2 at different values. Therefore, the light irradiation device is capable of distinguishing between the position P4 of detecting the light amount I1 and the position P5 of detecting the light amount I2. Accordingly, when fine adjustment of the origin position of the optical member 50 in the rotation direction E is necessary, one of the plurality of positions P4 and P5 can be set as the origin position.

(1-5) Second Modification of First Embodiment

FIG. 8A and FIG. 8B are a front view and a side view schematically showing an optical member 60 of a light irradiation device according to a second modification of the first embodiment. FIG. 9A is a front view schematically showing a light guide part 63 of the optical member 60 shown in FIG. 8A. FIG. 9B is a top view of light emission end parts of the light guide part 63.

The light irradiation device according to the second modification of the first embodiment differs from the light irradiation device 1 shown in FIG. 1 to FIG. 4 in the shape of the light guide part 63 of the optical member 60 and the size of the photoreception part 30b of a sensor 30a. Except for these features, the light irradiation device according to the second modification of the first embodiment is the same as the light irradiation device 1 shown in FIG. 1 to FIG. 4. Each component identical to a component of the light irradiation device 1 is assigned the same reference character as in the light irradiation device 1 and descriptions of these components are omitted.

Components 61, 61a and 61b respectively correspond to the components 21, 21a and 21b. Components 62, 62a and 62b respectively correspond to the components 22, 22a and 22b. In regard to these components, the description of the light irradiation device 1 is substituted for description of the second modification.

The light guide part 63 corresponds to the light guide part 23. The structure of light emission end parts 64, 65 and 66 of the light guide part 63 differs from the structure of the light emission end parts 24 and 25 of the light guide part 23. In regard to other features of the light guide part 63, the description given of the light guide part 23 is substituted for description of the light guide part 63.

As shown in FIG. 8A, FIG. 9A and FIG. 9B, the light guide part 63 includes the light emission end part 64, the light emission end part 65 and the light emission end part 66. A light emission surface 64a of the light emission end part 64, a light emission surface 65a of the light emission end part 65 and a light emission surface 66a of the light emission end part 66 are equal to each other in the area. The area of the light emission surface 64a, 65a, 66a is the area of a region emitting detection light L41b, L42b, L43b.

The light amounts of the detection light L41b, the detection light L42b and the detection light L43b emitted from the light emission end part 64, the light emission end part 65 and the light emission end part 66 differ from each other.

In the circumferential direction of the optical member 60, an interval between the center of the light emission surface 64a of the light emission end part 64 and the center of the light emission surface 65a of the light emission end part 65 is a distance F1. Further, an interval between the center of the light emission surface 65a of the light emission end part 65 and the center of the light emission surface 66a of the light emission end part 66 is also the distance F1. Namely, the interval between the center of the light emission surface 64a of the light emission end part 64 and the center of the light emission surface 65a of the light emission end part 65 is equal to the interval between the center of the light emission surface 65a of the light emission end part 65 and the center of the light emission surface 66a of the light emission end part 66.

Further, the light emission end part 64, the light emission end part 65 and the light emission end part 66 are formed by providing the light guide part 63 with two notch parts each in the shape of a V-shaped groove. A notch in the shape of a V-shaped groove is formed between the light emission end part 64 and the light emission end part 65. A notch in the shape of a V-shaped groove is formed between the light emission end part 65 and the light emission end part 66.

As shown in FIG. 9A, at the position of bottoms of the two notch parts of the light guide part 63, the lengths of the three divided parts in the circumferential direction are W4, W5 and W6. The length of a light incidence part 64b of the light emission end part 64 in the circumferential direction is W4. The length of a light incidence part 65b of the light emission end part 65 in the circumferential direction is W5. The length of a light incidence part 66b of the light emission end part 66 in the circumferential direction is W6. In FIG. 9A and FIG. 9B, the circumferential direction is the x-axis direction. At the position of the bottoms of the two notch parts of the light guide part 63, the ratio among the lengths of the three divided parts in the circumferential direction is W4:W5:W6. Each notch part is in the shape of a V-shaped groove. The three divided parts are a part including the light emission end part 64, a part including the light emission end part 65 and a part including the light emission end part 66. Incidentally, the dimensions of the light emission end parts 64, 65 and 66 in the thickness direction are the same as each other. In FIG. 9A and FIG. 9B, the thickness direction is the y-axis direction.

Therefore, at the position of the bottoms of the two notch parts of the light guide part 63, the ratio among the cross-sectional areas of the three divided parts is also W4:W5:W6. The light incidence part 64b is situated at the position of the bottoms of the notch parts in the light emission end part 64. The light incidence part 65b is situated at the position of the bottoms of the notch parts in the light emission end part 65. The light incidence part 66b is situated at the position of the bottoms of the notch parts in the light emission end part 66. Thus, the ratio among the areas of the light incidence part 64b, the light incidence part 65b and the light incidence part 66b is W4:W5:W6. In this case, the ratio among the light amounts of the detection light L41b, the detection light L42b and the detection light L43b emitted from the light emission end part 64, the light emission end part 65 and the light emission end part 66 is W4:W5:W6. The areas of the light emission surfaces 64a, 65a and 66a of the light guide part 63 are the same as each other. The areas of the light incidence parts 64b, 65b and 66b of the light guide part 63 are different from each other. The light amount of the detection light L41b, L42b, L43b is proportional to the area of the light incidence part 64b, 65b, 66b. Incidentally, distribution of the amount of light entering the light guide part 63 is considered to be uniform.

FIG. 10A to FIG. 10C are diagrams showing the positional relationship between the light guide part 63 of the optical member 60 and the sensor 30a shown in FIG. 8A. FIG. 10A to FIG. 10C show positions P6, P7 and P8. The positions P6, P7 and P8 are positions of the light emission end parts 64, 65 and 66 with respect to the sensor 30a when the optical member 60 rotates around the rotation axis AR.

FIG. 10A shows a case where the position of the optical member 60 in the rotation direction E is the position P6. FIG. 10B shows a case where the position of the optical member 60 in the rotation direction E is the position P7. FIG. 10C shows a case where the position of the optical member 60 in the rotation direction E is the position P8.

The shape of the photoreception part 30b of the sensor 30a is the same as the shape of the light emission surface 64a of the light emission end part 64, the shape of the light emission surface 65a of the light emission end part 65 and the shape of the light emission surface 66a of the light emission end part 66. When the area of the photoreception part 30b of the sensor 30a is an area S, for example, the area of the light emission surface 64a of the light emission end part 64, the area of the light emission surface 65a of the light emission end part 65 and the area of the light emission surface 66a of the light emission end part 66 can also be set at the area S. It is also possible to set the area S of the photoreception part 30b of the sensor 30a to be larger than the area of the light emission surface 64a of the light emission end part 64, the area of the light emission surface 65a of the light emission end part 65 and the area of the light emission surface 66a of the light emission end part 66.

However, the area S of the photoreception part 30b of the sensor 30a is desired to be an area with which the photoreception part 30b cannot simultaneously receive detection light from a plurality of light emission end parts among the light emission end part 64, the light emission end part 65 and the light emission end part 66. Specifically, the photoreception part 30b of the sensor 30a is desired to be in a size with which the photoreception part 30b cannot simultaneously receive the detection light L41b emitted from the light emission end part 64 and the detection light L42b emitted from the light emission end part 65, for example.

At the position P6, the light emission end part 64 faces the sensor 30a. The light emission end part 65 and the light emission end part 66 do not face the sensor 30a. The detection light L41b emitted from the light emission end part 64 reaches the sensor 30a. The detection light L42b emitted from the light emission end part 65 and the detection light L43b emitted from the light emission end part 66 do not reach the sensor 30a. Thus, the light reception amount of the sensor 30a equals the light amount of the detection light L41b emitted from the light emission end part 64.

At the position P7, the light emission end part 64 does not face the sensor 30a. The light emission end part 65 faces the sensor 30a. The light emission end part 66 does not face the sensor 30a. The detection light L41b emitted from the light emission end part 64 does not reach the sensor 30a. The detection light L42b emitted from the light emission end part 65 reaches the sensor 30a. The detection light L43b emitted from the light emission end part 66 does not reach the sensor 30a. Thus, the light reception amount of the sensor 30a equals the light amount of the detection light L42b emitted from the light emission end part 65.

At the position P8, the light emission end part 64 and the light emission end part 65 do not face the sensor 30a. The light emission end part 66 faces the sensor 30a. The detection light L41b emitted from the light emission end part 64 and the detection light L42b emitted from the light emission end part 65 do not reach the sensor 30a. The detection light L43b emitted from the light emission end part 66 reaches the sensor 30a. Thus, the light reception amount of the sensor 30a equals the light amount of the detection light L43b emitted from the light emission end part 66.

In the light irradiation device according to the second modification, the light amounts of the detection light L41b, the detection light L42b and the detection light L43b emitted from the light emission end part 64, the light emission end part 65 and the light emission end part 66 are different from each other. Accordingly, when fine adjustment of the origin position of the optical member 60 in the rotation direction E is necessary, one of the plurality of positions P6, P7 and P8 can be set as the origin position.

(2) Second Embodiment

Figure 11:
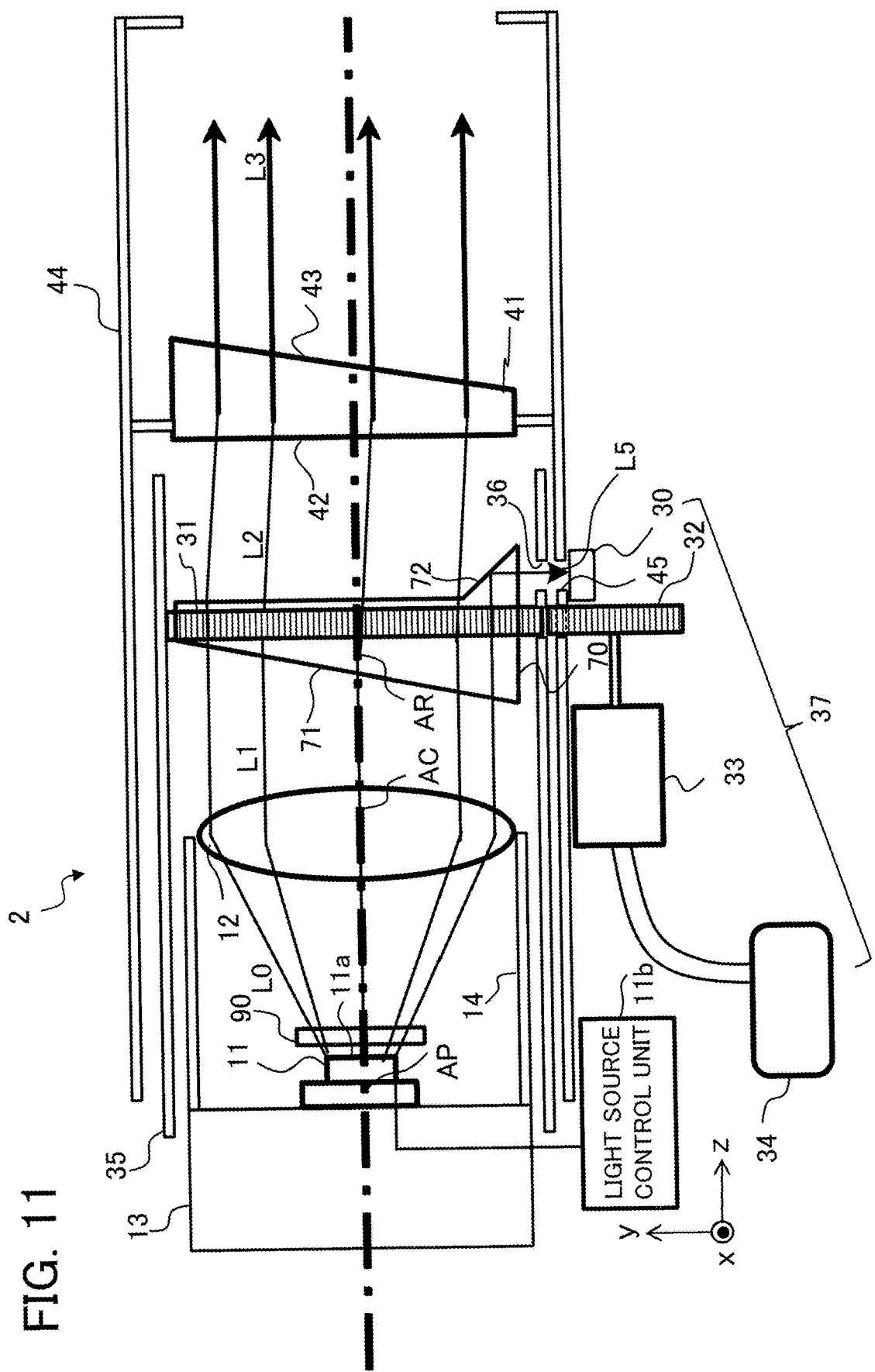
FIG. 11 is a diagram schematically showing a configuration of a light irradiation device according to a second embodiment of the present invention.

FIG. 11 is a diagram schematically showing a configuration of a light irradiation device 2 according to a second embodiment of the present invention. In FIG. 11, each component identical or corresponding to a component shown in FIG. 1 (first embodiment) is assigned the same reference character as in FIG. 1. Therefore, descriptions of these components are omitted.

Figures 12A, 12B:
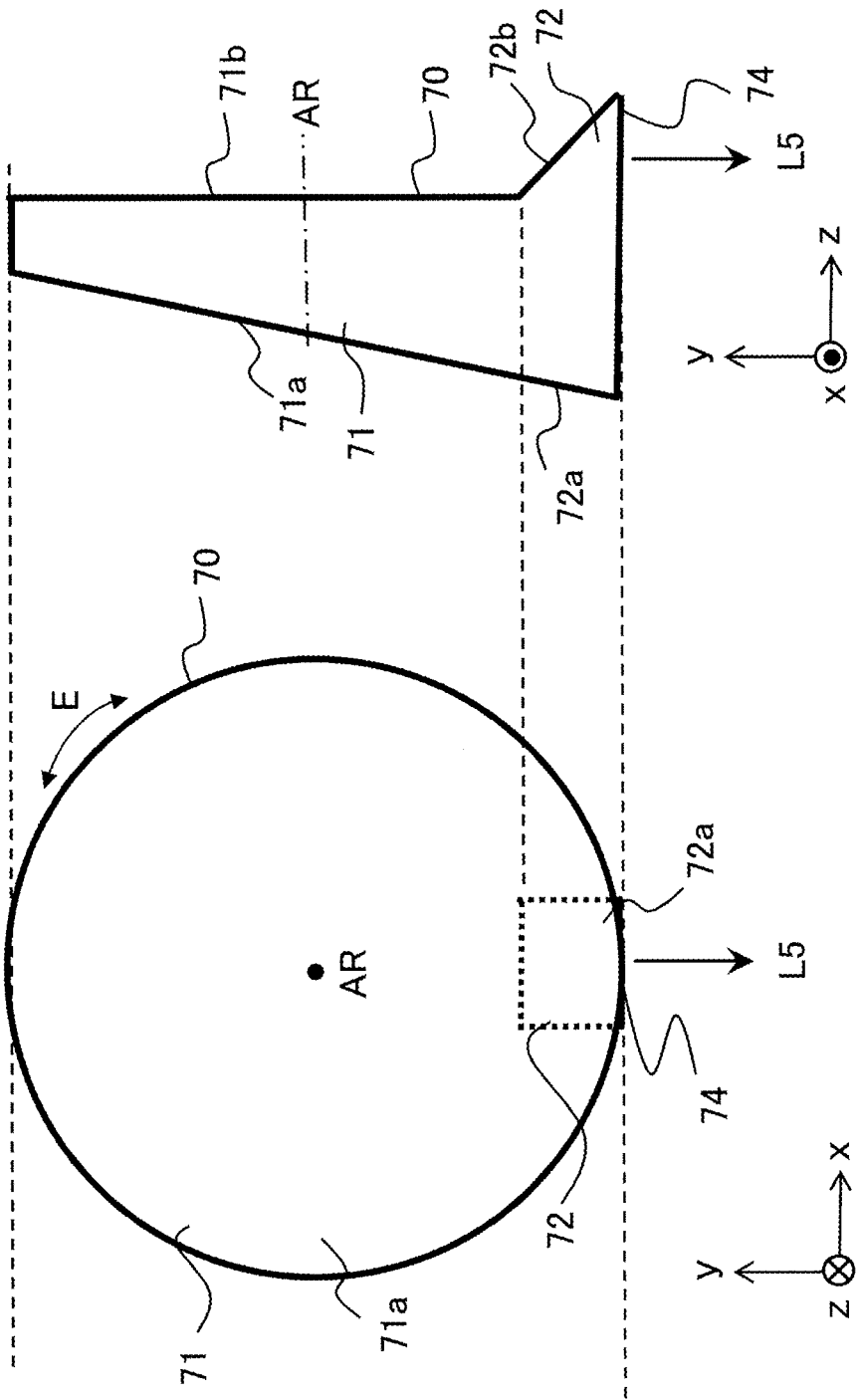
FIG. 12A and FIG. 12B are a front view and a side view schematically showing an optical member of the light irradiation device according to the second embodiment.

FIG. 12A and FIG. 12B are a front view and a side view schematically showing an optical member 70 of the light irradiation device 2 according to the second embodiment. The light irradiation device 2 according to the second embodiment differs from the light irradiation device 1 according to the first embodiment in the structure of the optical member 70. Except for this feature, the light irradiation device 2 according to the second embodiment is the same as the light irradiation device 1 according to the first embodiment.

Components 71, 71a and 71b respectively correspond to the components 21, 21a and 21b. In regard to these components, the description of the light irradiation device 1 is substituted for description of the light irradiation device 2. Components 72, 72a and 72b respectively correspond to the components 22, 22a and 22b. The structure of a prism part 72 differs from the structure of the prism part 22.

As shown in FIG. 11, FIG. 12A and FIG. 12B, parallel light is incident upon the optical member 70, for example. The optical member 70 includes a prism part 71 and the prism part 72. The prism part 71 emits the irradiation light L2. The light distribution of the irradiation light L2 changes depending on the position of the optical member 70 in the rotation direction E. The prism part 72 emits detection light L5. The detection light L5 is emitted in an emission direction corresponding to the position of the optical member 70 in the rotation direction E. The optical member 70 deflects the incident light L1 and emits the irradiation light L2 and the detection light L5. The optical member 70 transforms the incident light L1 to the irradiation light L2 and the detection light L5.

As shown in FIG. 12A and FIG. 12B, the prism part 71 is a wedge prism. The prism part 71 has a surface 71a and a surface 71b. The surface 71a and the surface 71b are arranged to face each other.

The surface 71a is formed on a light incidence surface's side of the optical member 70. The surface 71a is formed on a light incidence surface of the optical member 70, for example. The surface 71a is formed on the light source 11's side. The surface 71a is a flat surface, for example. The surface 71a has an intersection point with the rotation axis AR.

The surface 71b is formed on a light emission surface's side of the optical member 70. The surface 71b is formed on a light emission surface of the optical member 70, for example. The surface 71b is a flat surface, for example. The surface 71b has an intersection point with the rotation axis AR.

The surface 71a and the surface 71b are surfaces inclined with respect to each other. The surface 71a is inclined with respect to the rotation axis AR. In FIG. 11 and FIG. 12B, the surface 71a is parallel to the x-axis and inclined with respect to the y-axis. The surface 71b is a surface orthogonal to the rotation axis AR. The surface 71b is parallel to both of the x-axis and the y-axis. The thickness of the prism part 71 is greater on the −y-axis side than on the +y-axis side. Therefore, the light entering the prism part 71 is deflected towards the −y-axis side.

The light L1 is incident upon the surface 71a. The light L1 incident upon the surface 71a is light parallel to the z-axis, for example. The rotation axis AR is parallel to the z-axis. The light L1 is refracted at the surface 71a. The light L1 refracted at the surface 71a is refracted at the surface 71b. The light L1 refracted at the surface 71b is emitted from the surface 71b as the irradiation light L2. The irradiation light L2 is light inclined with respect to the rotation axis AR. The irradiation light L2 is light inclined with respect to the z-axis.

The traveling direction of the irradiation light L2 changes depending on the position of the optical member 70 in the rotation direction E. In other words, the light distribution of the irradiation light L2 changes depending on the position of the optical member 70 in the rotation direction E.

However, it is permissible even if the surface 71a is a surface orthogonal to the rotation axis AR and the surface 71b is a surface inclined with respect to the rotation axis AR. In other words, it is permissible even if the surface 71a is a surface parallel to both of the x-axis and the y-axis and the surface 71b is a surface parallel to the x-axis and inclined with respect to the y-axis. In this case, the light L1 parallel to the z-axis is perpendicularly incident upon the surface 71a. After entering the prism part 71 through the surface 71a, the light L1 is refracted at the surface 71b. The light L1 refracted at the surface 71b is emitted from the surface 71b as the irradiation light L2. The irradiation light L2 is light inclined with respect to the rotation axis AR. The irradiation light L2 is light inclined with respect to the z-axis.

The prism part 72 extracts the detection light L5 from the entered light L1. The prism part 72 is a prism for the detection light.

The prism part 72 is famed on an outer circumferential side of the optical member 70 around the rotation axis AR. The prism part 72 is formed in an outer circumferential part of the optical member 70 around the rotation axis AR. The prism part 72 is famed on a part of the prism part 71 having a large thickness, for example. The prism part 72 is formed on a part of the prism part 71 having a thickness larger than an average wall thickness of the prism part 71, for example. The prism part 72 is formed on a part of the prism part 71 having the largest thickness, for example.

As shown in FIG. 12A and FIG. 12B, the prism part 72 has a surface 72a and a surface 72b. The surface 72a and the surface 72b are arranged to face each other.

The surface 72a is formed on the light incidence surface's side of the optical member 70. The surface 72a is formed on the light incidence surface of the optical member 70, for example. The surface 72a is formed on the light source 11's side. The surface 72a may be on the same surface as the surface 71a, for example. As shown in FIG. 12B, the surface 72a may form the same surface with the surface 71a, for example. The surface 72a is a flat surface, for example.

The surface 72b is formed on the light emission surface's side of the optical member 70. The surface 72b is formed on the light emission surface of the optical member 70, for example. The surface 22b is a flat surface, for example.

The surface 72a and the surface 72b are surfaces inclined with respect to each other. The surface 72b is inclined with respect to the surface 71b. The surface 72a is inclined with respect to the rotation axis AR. In FIG. 11 and FIG. 12B, the surface 72a is parallel to the x-axis and inclined with respect to the y-axis. The surface 72b is a surface inclined with respect to the rotation axis AR. The surface 72b is parallel to the x-axis and inclined with respect to the y-axis.

In the direction of the rotation axis AR, an outer circumferential side of the surface 72a around the rotation axis AR is situated on the light source 11's side compared to an inner circumferential side of the surface 72a. The light source 11's side is the −z-axis side. In the direction of the rotation axis AR, the outer circumferential side of the surface 72a around the rotation axis AR projects in the direction (−z-axis direction) opposite to the incidence direction of the light L1 (+z-axis direction) compared to the inner circumferential side of the surface 72a. In other words, in the direction of the rotation axis AR, the outer circumferential side of the surface 72a around the rotation axis AR projects towards the upstream side in the traveling direction of the light L1 compared to the inner circumferential side of the surface 72a. In the direction of the rotation axis AR, the outer circumferential side of the surface 72b around the rotation axis AR projects towards an emission direction's side of the light L2 compared to the inner circumferential side of the surface 72b. The emission direction's side is the +z-axis direction side.

As shown in FIG. 11, the light L1 is light parallel to the z-axis, for example. The light L1 is light parallel to the rotation axis AR, for example. The light L1 is incident upon the surface 72a. The light L1 is refracted at the surface 72a. The light L1 is refracted at the surface 72a of the prism part 72. The light L1 is refracted towards the outer circumferential side of the optical member 70 around the rotation axis AR.

The light L1 refracted at the surface 72a is reflected by the surface 72b. The light L1 refracted at the surface 72a undergoes total reflection by the surface 72b, for example. The light L1 refracted at the surface 72a is reflected towards the outer circumferential side of the optical member 70 around the rotation axis AR. The light L1 reflected by the surface 72b travels towards the outer circumferential side of the optical member 70. The light L1 reflected by the surface 72b is emitted from a side face 74 of the prism part 72 as the detection light L5. The light L1 reflected by the surface 72b is emitted from a side face of the optical member 70 as the detection light L5. The side face 74 is a surface on the outer circumferential side around the rotation axis AR.

Incidentally, no light guide part is provided on the outside of the prism part 72 in the radial direction centering at the rotation axis AR. However, it is also possible to provide the light guide part similarly to the first embodiment.

The body tube 35 holds the optical member 70. The body tube 44 holds the wedge prism 41. The body tube 35 has the opening 36. The body tube 44 has the opening 45. The position of the opening 45 in the z-axis direction is the same as the position of the opening 36 in the z-axis direction. The body tube 35 is rotated with respect to the body tube 44. Then, the position of the opening 45 in the circumferential direction and the position of the opening 36 in the circumferential direction are made to coincide with each other. The opening 45 is situated at a position facing the opening 36. The position where the opening 45 and the opening 36 face each other is the origin position, for example.

In this case, the detection light L5 emitted from the side face 74 of the prism part 72 passes through the opening 36 and reaches the opening 45. The detection light L5 emitted from the side face 74 of the prism part 72 passes through the opening 45 and reaches the sensor 30. Namely, the detection light L5 emitted from the side face 74 of the prism part 72 passes through the opening 45 and enters the photoreception part 30b of the sensor 30. Here, the detection light L5 is the light deflected by the prism part 72 and emitted from the side face 74 of the prism part 72. Incidentally, in the optical member 70, the side face 74 of the prism part 72 is the side face of the optical member 70.

The sensor 30 receives the detection light L5. The sensor 30 receives the detection light L5 at a light amount depending on the position of the optical member 70 in the rotation direction E. The sensor 30 receives the detection light L5 deflected by the prism part 72. The sensor 30 detects the position of the optical member 70 in the rotation direction E by receiving the deflected detection light L5. The sensor 30 is capable of detecting the origin position of the optical member 70 in the rotation direction E, for example.

As described above, the light irradiation device 2 is capable of detecting the position of the optical member 70 in the rotation direction E by using the light L0 emitted by the light source 11. As above, the light irradiation device 2 is capable of detecting the position of the optical member 70 in the rotation direction E with a simple configuration. The position of the optical member 70 in the rotation direction E is the origin position, for example.

Further, since the light irradiation device 2 includes no light guide part, the configuration can be simplified further.

(3) Third Embodiment

FIG. 13 is a diagram schematically showing a configuration of a light irradiation device 3 according to a third embodiment of the present invention. In FIG. 13, each component identical or corresponding to a component shown in FIG. 1 (first embodiment) is assigned the same reference character as in FIG. 1. Therefore, descriptions of these components are omitted.

Figure 14A:
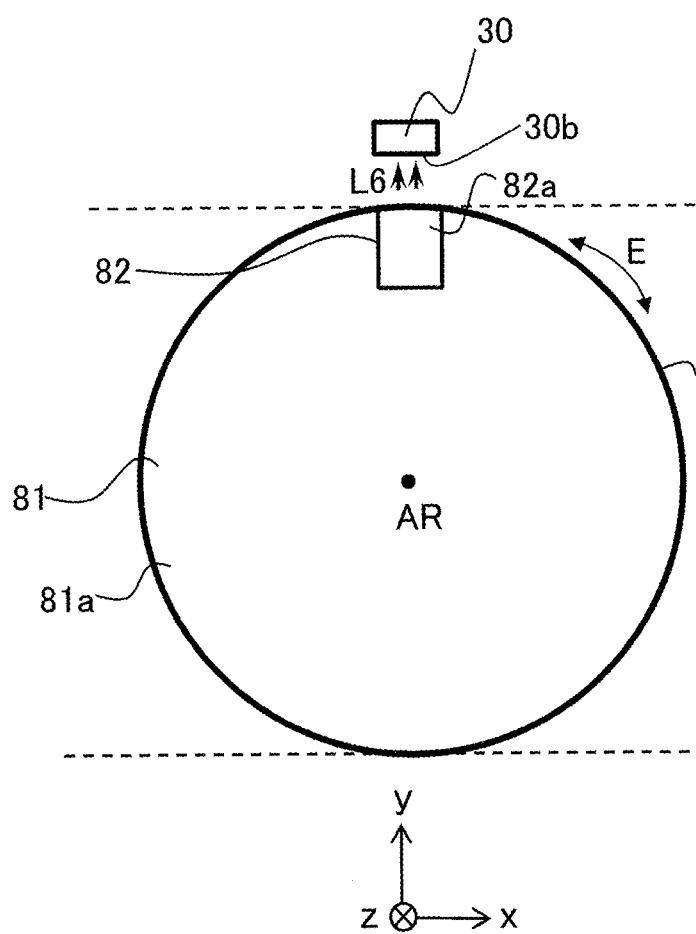
FIG. 14A and FIG. 14B are a front view and a side view schematically showing an optical member of the light irradiation device according to the third embodiment.
Figure 14B:
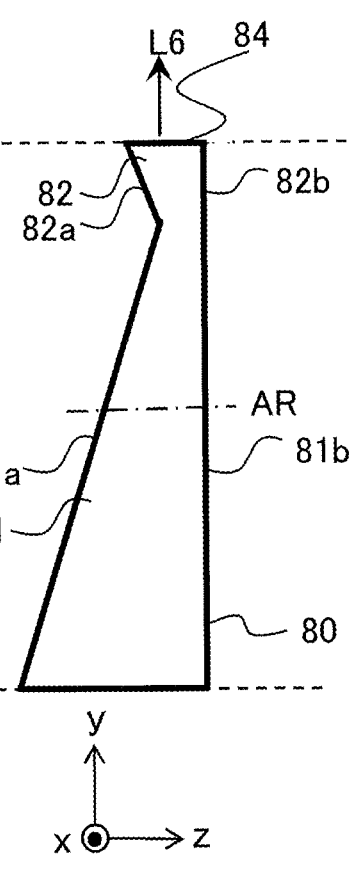

FIG. 14A and FIG. 14B are a front view and a side view schematically showing an optical member 80 of the light irradiation device 3 according to the third embodiment. The light irradiation device 3 according to the third embodiment differs from the light irradiation device 1 according to the first embodiment in the structure of the optical member 80. In other words, the light irradiation device 3 according to the third embodiment differs from the light irradiation device 1 according to the first embodiment in that the optical member 80 includes no light guide part. Except for this feature, the light irradiation device 3 according to the third embodiment is the same as the light irradiation device 1 according to the first embodiment. In regard to features other than including no light guide part, the description of the light irradiation device 1 is substituted for description of the light irradiation device 3.

As shown in FIG. 13, FIG. 14A and FIG. 14B, parallel light is incident upon the optical member 80, for example. The optical member 80 includes a prism part 81 and a prism part 82. The optical member 80 deflects the incident light L1 and emits the irradiation light L2 and detection light L6. The optical member 80 transforms the incident light L1 to the irradiation light L2 and the detection light L6.

The prism part 81 is a part that changes the emission direction of the irradiation light L2. The prism part 81 emits the irradiation light L2. The light distribution of the irradiation light L2 changes depending on the position of the optical member 80 in the rotation direction E. The emission direction of the irradiation light L2 is changed by the rotation of the optical member 80 in the rotation direction E.

The prism part 82 extracts the detection light L6 from the entered light L1. The prism part 82 is a prism for the detection light. The prism part 82 emits the detection light L6 in an emission direction corresponding to the position of the optical member 80 in the rotation direction E.

The prism part 81 corresponds to the prism part 21. A surface 81a corresponds to the surface 21a. A surface 81b corresponds to the surface 21b. The prism part 82 corresponds to the prism part 22. A surface 82a corresponds to the surface 22a. A surface 82b corresponds to the surface 22b. In regard to these components, the description of the light irradiation device 1 is substituted for description of the light irradiation device 3.

As shown in FIG. 14A and FIG. 14B, the prism part 81 is a wedge prism. The prism part 81 has the surface 81a and the surface 81b. The surface 81a and the surface 81b are arranged to face each other.

The surface 81a and the surface 81b are surfaces inclined with respect to each other. The surface 81a is inclined with respect to the surface 81b. The surface 81a is inclined with respect to the rotation axis AR. In FIG. 13 and FIG. 14B, the surface 81a is parallel to the x-axis and inclined with respect to the y-axis. The surface 81b is a surface orthogonal to the rotation axis AR, for example. The surface 81b is parallel to both of the x-axis and the y-axis. The thickness of the prism part 81 is greater on the −y-axis side than on the +y-axis side. Therefore, the light entering the prism part 81 is deflected towards the −y-axis side.

The light L1 is incident upon the surface 81a. The light L1 incident upon the surface 81a is light parallel to the z-axis, for example. The light L1 is refracted at the surface 81a. The light L1 refracted at the surface 81a is refracted at the surface 81b. The light L1 refracted at the surface 81b is emitted from the surface 81b as the irradiation light L2. The irradiation light L2 is light inclined with respect to the rotation axis AR. The irradiation light L2 is light inclined with respect to the z-axis.

The traveling direction of the irradiation light L2 changes depending on the position of the optical member 80 in the rotation direction E. In other words, the light distribution of the irradiation light L2 changes depending on the position of the optical member 80 in the rotation direction E.

However, it is permissible even if the surface 81a is a surface orthogonal to the rotation axis AR and the surface 81b is a surface inclined with respect to the rotation axis AR. In other words, it is permissible even if the surface 81a is a surface parallel to both of the x-axis and the y-axis and the surface 81b is a surface parallel to the x-axis and inclined with respect to the y-axis. In this case, the light L1 parallel to the z-axis is perpendicularly incident upon the surface 81a. After entering the prism part 81 through the surface 81a, the light L1 is refracted at the surface 81b. The light L1 refracted at the surface 81b is emitted from the surface 81b as the irradiation light L2. The irradiation light L2 is light inclined with respect to the rotation axis AR. The irradiation light L2 is light inclined with respect to the z-axis.

The prism part 82 extracts the detection light L6 from the entered light. The prism part 82 is a prism for the detection light.

The prism part 82 is famed on an outer circumferential side of the optical member 80 around the rotation axis AR. The prism part 82 is formed in an outer circumferential part of the optical member 80 around the rotation axis AR. The prism part 82 is famed on a part of the prism part 81 having a small thickness, for example. The prism part 82 is formed on a part of the prism part 81 having a thickness smaller than an average wall thickness of the prism part 81, for example.

The prism part 82 is formed on a part of the prism part 81 having the smallest thickness, for example.

As shown in FIG. 14A and FIG. 14B, the prism part 82 has the surface 82*a* and the surface 82*b*. The surface 82*a* and the surface 82*b* are arranged to face each other.

The surface 82*a* and the surface 82*b* are surfaces inclined with respect to each other. The surface 82*a* is inclined with respect to the surface 82*b*. The surface 82*a* is a surface inclined with respect to the rotation axis AR. In FIG. 13 and FIG. 14B, the surface 82*a* is parallel to the x-axis and inclined with respect to the y-axis. As shown in FIG. 14B, the surface 82*a* is inclined in an opposite direction compared to the surface 81*a*. The surface 82*b* is a surface orthogonal to the rotation axis AR, for example. The surface 82*b* is parallel to both of the x-axis and the y-axis.

In the direction of the rotation axis AR, an outer circumferential side of the surface 82*a* around the rotation axis AR is situated on the light source 11's side compared to an inner circumferential side of the surface 82*a*. In the direction of the rotation axis AR, the outer circumferential side of the surface 82*a* around the rotation axis AR projects towards the side from which the light L1 is incident compared to the inner circumferential side of the surface 82*a*. The side from which the light L1 is incident is the −z-axis direction side. The outer circumferential side of the surface 82*a* around the rotation axis AR projects in a direction (−z-axis direction) opposite to the incidence direction of the light L1 (+z-axis direction) compared to the inner circumferential side of the surface 82*a*. In other words, in the direction of the rotation axis AR, the outer circumferential side of the surface 82*a* around the rotation axis AR projects towards the upstream side in the traveling direction of the light L1 compared to the inner circumferential side of the surface 82*a*.

As shown in FIG. 13, the light L1 is light parallel to the z-axis, for example. The light L1 is light parallel to the rotation axis AR, for example. The light L1 is incident upon the surface 82*a*. The light L1 is refracted at the surface 82*a*. The light L1 is refracted at the surface 82*a* of the prism part 82. The light L1 is refracted towards the outer circumferential side of the optical member 80 around the rotation axis AR.

The light L1 refracted at the surface 82*a* is reflected by the surface 82*b*. The light L1 refracted at the surface 82*a* undergoes total reflection by the surface 82*b*, for example. The light L1 refracted at the surface 82*a* is reflected towards the outer circumferential side of the optical member 80 around the rotation axis AR. The light L1 reflected by the surface 82*b* travels towards the outer circumferential side of the optical member 80. The light L1 reflected by the surface 82*b* is emitted from a side face 84 of the prism part 82 as the detection light L6. The side face 84 is a surface on the outer circumferential side around the rotation axis AR. The side face 84 of the prism part 82 is a side face of the optical member 80, for example.

However, the prism part 82 may also be configured to have a surface 82*a* parallel to both of the x-axis and the y-axis and a surface 82*b* parallel to the x-axis and inclined with respect to the y-axis. In the direction of the rotation axis AR, the outer circumferential side of the surface 82*b* around the rotation axis AR projects towards the emission direction side of the light L2 compared to the inner circumferential side of the surface 82*b*. The emission direction side is the +z-axis direction side. In this case, the light L1 parallel to the z-axis enters the prism part 82 through the surface 82*a*. Thereafter, the light L1 is reflected by the surface 82*b* and emitted from the side face 84 of the prism part 82 as the detection light L6.

The body tube 35 holds the optical member 80. The body tube 44 holds the wedge prism 41. The body tube 35 has the opening 36. The body tube 44 has the opening 45.

The position of the opening 45 in the z-axis direction is the same as the position of the opening 36 in the z-axis direction. The position of the opening 45 in the direction of the rotation axis AR is the same as the position of the opening 36 in the direction of the rotation axis AR. The body tube 35 is rotated with respect to the body tube 44. Then, the position of the opening 45 in the circumferential direction and the position of the opening 36 in the circumferential direction are made to coincide with each other. The opening 45 is situated at a position facing the opening 36. The position where the opening 45 and the opening 36 face each other is the origin position, for example.

In this case, the detection light L6 emitted from the side face 84 of the prism part 82 passes through the opening 36 and reaches the opening 45. The detection light L6 emitted from the side face 84 of the prism part 82 passes through the opening 45 and reaches the sensor 30. Namely, the detection light L6 emitted from the side face 84 of the prism part 82 passes through the opening 45 and enters the photoreception part 30*b* of the sensor 30. Here, the detection light L6 is the light deflected by the prism part 82 and emitted from the side face 84 of the prism part 82. In the optical member 80, the side face 84 of the prism part 82 is the side face of the optical member 80, for example.

The sensor 30 receives the detection light L6 at a light amount depending on the position of the optical member 80 in the rotation direction E. The sensor 30 receives the detection light L6 deflected by the prism part 82. The sensor 30 detects the position of the optical member 80 in the rotation direction E by receiving the deflected detection light L6. The sensor 30 is capable of detecting the origin position of the optical member 80 in the rotation direction E, for example.

As described above, the light irradiation device 3 is capable of detecting the position of the optical member 80 in the rotation direction E by using the light L0 emitted by the light source 11. As above, the light irradiation device 3 is capable of detecting the position of the optical member 80 in the rotation direction E with a simple configuration. The position of the optical member 80 in the rotation direction E is the origin position, for example.

Further, since the light irradiation device 3 includes no light guide part, the configuration can be simplified further.

Incidentally, terms indicating positional relationship between components or the shape of a component, such as "parallel", "orthogonal" or "center", may have been used in the above embodiments. Ranges indicated by these terms are ranges allowing for tolerances in the manufacture, variations in the assembly, or the like. Therefore, when a description indicating positional relationship between components or the shape of a component is included in the claims, such a description is intended to include a range allowing for tolerances in the manufacture, variations in the assembly, or the like.

Further, while embodiments of the present invention have been described as above, the present invention is not limited to these embodiments.

Based on the above embodiments, the contents of the present invention will be described below as appendix (1), appendix (2) and appendix (3). Reference characters are assigned to the appendix (1), the appendix (2) and the appendix (3) independently of each other. Thus, "appendix 1" exists in each of the appendix (1), the appendix (2) and the appendix (3), for example. Further, features of the appendix (1), features of the appendix (2) and features of the appendix (3) can be combined with each other.

(4) Appendix (1)

Appendix 1

A light irradiation device comprising:
a first light source that emits light;
a wedge prism that allows the light emitted from the first light source to enter, deflects the entered light, emits the deflected light, and is supported to be rotatable around a rotation axis; and
a sensor that detects a position of the wedge prism in a rotation direction, wherein
the wedge prism includes a prism in an outer circumferential part of the wedge prism around the rotation axis,
the prism deflects the light emitted from the first light source and entered the prism, in a direction towards an outer circumference of the wedge prism, and
the sensor receives the light deflected by the prism.

Appendix 2

The light irradiation device according to appendix 1, wherein the wedge prism includes a light guide part that is provided on an outer circumferential side of the prism and guides the light deflected by the prism to the sensor.

Appendix 3

The light irradiation device according to appendix 2, wherein
the light guide part includes a plurality of light emission end parts arranged side by side in the rotation direction of the wedge prism, and
the sensor successively receives light emitted from the light emission end parts according to the rotation of the wedge prism.

Appendix 4

The light irradiation device according to appendix 3, wherein a light amount of the light emitted from each of the plurality of light emission end parts is equal to each other.

Appendix 5

The light irradiation device according to appendix 3, wherein a light amount of the light emitted from each of the plurality of light emission end parts is different from each other.

(5) Appendix (2)

Appendix 1

A light irradiation device comprising:
a light source that emits light;
an optical member that is supported to be rotatable around a rotation axis and emits irradiation light based on the light and detection light based on the light; and
a sensor,
wherein the optical member includes:
a first prism part that emits the irradiation light whose light distribution changes depending on a position of the optical member in a rotation direction; and
a second prism part that guides the detection light in an emission direction corresponding to the position in the rotation direction,
wherein the sensor receives the detection light at a light amount depending on the position in the rotation direction.

Appendix 2

The light irradiation device according to appendix 1, wherein the first prism part is a wedge prism.

Appendix 3

The light irradiation device according to appendix 1 or 2, wherein the second prism part is arranged on an outer circumferential side of the optical member.

Appendix 4

The light irradiation device according to any one of appendixes 1 to 3, wherein the second prism part emits the detection light outward in a radial direction of the optical member.

Appendix 5

The light irradiation device according to any one of appendixes 1 to 4, wherein the optical member includes a light guide part that guides the detection light outward in a radial direction of the optical member.

Appendix 6

The light irradiation device according to appendix 5, wherein
the light guide part includes a first light emission end part and a second light emission end part arranged side by side in the rotation direction of the optical member, and
the sensor receives first detection light as the detection light emitted from the first light emission end part, second detection light as the detection light emitted from the second light emission end part, or both of the first detection light and the second detection light depending on the position in the rotation direction.

Appendix 7

The light irradiation device according to appendix 6, wherein the light amount of the first detection light and the light amount of the second detection light are equal to each other.

Appendix 8

The light irradiation device according to appendix 6, wherein the light amount of the first detection light and the light amount of the second detection light are different from each other.

Appendix 9

The light irradiation device according to appendix 5, wherein
the light guide part includes a first light emission end part, a second light emission end part and a third light emission end part arranged side by side in the rotation direction, and the sensor receives first detection light as the detection light emitted from the first light emission end part, second detection light as the detection light emitted from the second light emission end part, or third detection light as the detection light emitted from the third light emission end part depending on the position in the rotation direction.

Appendix 10

The light irradiation device according to appendix 9, wherein
areas of the first light emission end part, the second light emission end part and the third light emission end part are different from each other, and
the light amount of the first detection light, the light amount of the second detection light and the light amount of the third detection light are different from each other.

Appendix 11

The light irradiation device according to appendix 9, wherein
areas of the first light emission end part, the second light emission end part and the third light emission end part are equal to each other, and
the light amount of the first detection light, the light amount of the second detection light and the light amount of the third detection light are different from each other.

(6) Appendix (3)

Appendix 1

A light irradiation device comprising:
a light source that emits light;
an optical member that is supported so as to rotate around a rotation axis and includes a first prism part that emits first detection light based on the light; and
a sensor that receives the first detection light and detects a light amount of the first detection light,
wherein the light amount of the first detection light received by the sensor changes depending on a position of the optical member in a rotation direction when the optical member rotates.

Appendix 2

The light irradiation device according to appendix 1, wherein the first prism part is arranged in an outer circumferential part of the optical member around the rotation axis.

Appendix 3

The light irradiation device according to appendix 1 or 2, wherein the light is incident upon the optical member along the rotation axis.

Appendix 4

The light irradiation device according to any one of appendixes 1 to 3, wherein the first prism part deflects the light entering the first prism part and emits the deflected light as the first detection light.

Appendix 5

The light irradiation device according to any one of appendixes 1 to 4, wherein the first prism part emits the first detection light outward in a radial direction centering at the rotation axis of the optical member.

Appendix 6

The light irradiation device according to any one of appendixes 1 to 5, wherein
the first prism part has a first surface that allows the light to enter and a second surface that is arranged to face the first surface, and
the second surface reflects the entered light outward in a radial direction centering at the rotation axis of the optical member.

Appendix 7

The light irradiation device according to appendix 6, wherein the second surface is a surface inclined with respect to the rotation axis.

Appendix 8

The light irradiation device according to appendix 6 or 7, wherein the first surface refracts the entering light outward in the radial direction centering at the rotation axis of the optical member.

Appendix 9

The light irradiation device according to any one of appendixes 6 to 8, wherein the first surface is a surface inclined with respect to the rotation axis.

Appendix 10

The light irradiation device according to any one of appendixes 6 to 9, wherein the first surface is formed on a side of a surface where the optical member allows the light to enter.

Appendix 11

The light irradiation device according to any one of appendixes 1 to 10, wherein a photoreception part of the sensor is arranged at a position facing a surface from which the first prism part emits the first detection light.

Appendix 12

The light irradiation device according to any one of appendixes 1 to 10, wherein the optical member includes a light guide part that guides the first detection light to a photoreception part of the sensor.

Appendix 13

The light irradiation device according to appendix 12, wherein the light guide part guides the first detection light outward in a radial direction centering at the rotation axis of the optical member.

Appendix 14

The light irradiation device according to appendix 12 or 13, wherein
the light guide part includes a first light emission end part and a second light emission end part arranged side by side in the rotation direction of the optical member, the first detection light includes second detection light and third detection light, the first light emission end part emits the second detection light, the second light emission end part emits the third detection light, and the sensor detects the light amount of the first detection light based on whether the first detection light is received or not and reception of at least the second detection light or the third detection light.

Appendix 15

The light irradiation device according to appendix 14, wherein the light amount of the second detection light and the light amount of the third detection light are equal to each other.

Appendix 16

The light irradiation device according to appendix 14, wherein the light amount of the second detection light and the light amount of the third detection light are different from each other.

Appendix 17

The light irradiation device according to any one of appendixes 14 to 16, wherein area of a first light emission surface of the first light emission end part that emits the second detection light is equal to area of a second light emission surface of the second light emission end part that emits the third detection light.

Appendix 18

The light irradiation device according to any one of appendixes 14 to 16, wherein area of a first light emission surface of the first light emission end part that emits the second detection light is different from area of a second light emission surface of the second light emission end part that emits the third detection light.

Appendix 19

The light irradiation device according to any one of appendixes 14 to 18, wherein area of a first light incidence surface where the second detection light enters the first light emission end part is equal to area of a second light incidence surface where the third detection light enters the second light emission end part.

Appendix 20

The light irradiation device according to any one of appendixes 14 to 18, wherein area of a first light incidence surface where the second detection light enters the first light emission end part is different from area of a second light incidence surface where the third detection light enters the second light emission end part.

Appendix 21

The light irradiation device according to any one of appendixes 12 to 20, wherein the photoreception part of the sensor is arranged at a position facing a surface from which the light guide part emits the first detection light.

Appendix 22

The light irradiation device according to any one of appendixes 1 to 21, wherein
the optical member includes a second prism part that emits irradiation light based on the light, and
the second prism part changes light distribution of the irradiation light depending on the position of the optical member in the rotation direction when the optical member rotates.

Appendix 23

The light irradiation device according to appendix 22, wherein the second prism part deflects the light entering the second prism part and emits the deflected light as the irradiation light.

Appendix 24

The light irradiation device according to appendix 22 or 23, wherein the second prism part emits the irradiation light in a direction opposite to a direction from which the light is incident upon the second prism part.

Appendix 25

The light irradiation device according to appendix 22 or 23, wherein
the second prism part has a third surface having an intersection point with the rotation axis and allowing the light to enter and a fourth surface having an intersection point with the rotation axis and arranged to face the third surface, and
the entered light is emitted from the fourth surface.

Appendix 26

The light irradiation device according to any one of appendixes 22 to 25, wherein the second prism part is a wedge prism.

DESCRIPTION OF REFERENCE CHARACTERS

1, 2, 3: light irradiation device, 11: light source, 11a: light emission surface, 12: lens part, 13: radiator, 14: body tube, 20, 50, 60, 70, 80: optical member, 21, 51, 61, 71, 81: prism part (wedge prism), 21a, 51a, 61a, 71a, 81a: surface, 21b, 51b, 61b, 71b, 81b: surface, 22, 52, 62, 72, 82: prism part (prism for detection light), 22a, 52a, 62a, 72a, 82a: surface, 22b, 52b, 62b, 72b, 82b: surface, 23, 53, 63: light guide part, 24, 25: light emission end part, 24a, 25a: light emission surface, 24b, 25b: light incidence part, 30, 30a: sensor, 30b: photoreception part, 31: gear, 32: gear, 33: motor, 34: motor control unit, 35: body tube, 36: opening, 41: wedge prism, 42: light incidence surface, 43: light emission surface, 44: body tube, 45: opening, 54, 55, 56, 64, 65, 66: light emission end part, 54a, 55a, 56a, 64a, 65a, 66a: light emission surface, 54b, 55b, 56b, 64b, 65b, 66b: light incidence surface, 74, 84: side face, 90: image formation unit, AP, AC: optical axis, AR: rotation axis, E: rotation direction of optical member, L0, L1: light, L2, L3: irradiation light, L4, L5, L6: detection light, L41, L41a, L41b: detection light, L42, L42a, L42b: detection light, L43a, L43b: detection light

What is claimed is:

1. A light irradiation device comprising:
a light source that emits light along an optical axis;
an optical member that is supported so as to rotate around a rotation axis and includes a first prism part that emits first detection light based on the light, the rotation axis and the optical axis being a same axis; and
a sensor that receives the first detection light and detects a light amount of the first detection light,
wherein the first prism part is arranged in an outer circumferential part of the optical member around the rotation axis,
the light amount of the first detection light received by the sensor changes depending on a position of the optical member in a rotation direction when the optical member rotates, and
the first prism part emits the first detection light outward in a radial direction centering at the rotation axis of the optical member.

2. The light irradiation device according to claim 1, wherein the first prism part deflects the light entering the first prism part and emits the deflected light as the first detection light.

3. The light irradiation device according to claim 1, wherein
the first prism part has a first surface that allows the light to enter and a second surface that is arranged to face the first surface, and
the second surface reflects the entered light outward in a radial direction centering at the rotation axis of the optical member.

4. The light irradiation device according to claim 3, wherein
the second surface is further configured to transmit irradiation light based on the light.

5. The light irradiation device according to claim 4, wherein
the irradiation light is inclined with respect to the rotation axis depending on the position of the optical member in the rotation direction when the optical member rotates.

6. The light irradiation device according to claim 1, wherein the optical member includes a light guide part that guides the first detection light to a photoreception part of the sensor.

7. The light irradiation device according to claim 6, wherein
the light guide part includes a first light emission end part and a second light emission end part arranged side by side in the rotation direction of the optical member,
the first detection light includes second detection light and third detection light,
the first light emission end part emits the second detection light,
the second light emission end part emits the third detection light, and
the sensor detects the light amount of the first detection light based on whether the first detection light is received or not and reception of at least the second detection light or the third detection light.

8. The light irradiation device according to claim 7, wherein the light amount of the second detection light and the light amount of the third detection light are equal to each other.

9. The light irradiation device according to claim 7, wherein the light amount of the second detection light and the light amount of the third detection light are different from each other.

10. The light irradiation device according to claim 6, wherein the light guide part has a rod shape.

11. The light irradiation device according to claim 6, wherein a cross section of the light guide part is a circular shape.

12. The light irradiation device according to claim 6, wherein the first detection light is reflected by a side face of the light guide part.

13. The light irradiation device according to claim 1, wherein
the optical member includes a second prism part that emits irradiation light based on the fight, and
the second prism part changes light distribution of the irradiation light depending on the position of the optical member in the rotation direction when the optical member rotates.

14. The light irradiation device according to claim 1, wherein
the optical member includes a second prism part that emits irradiation light in a direction parallel to the rotation axis.

15. The light irradiation device according to claim 1, wherein the first prism part includes at least two emission surfaces to emit the first detection light.

16. The light irradiation device according to claim 1, wherein the optical member is configured to rotate with respect to the light source.

17. A light irradiation device comprising:
a light source that emits light;
an optical member that is supported so as to rotate around a rotation axis and includes a first prism part that emits first detection light based on the light; and
a sensor that receives the first detection light and detects a light amount of the first detection light,
wherein the first prism part is arranged in an outer circumferential part of the optical member around the rotation axis,
the light amount of the first detection light received by the sensor changes depending on a position of the optical member in a rotation direction when the optical member rotates,
the first prism part has a first surface that allows the light to enter and a second surface that is arranged to face the first surface,
the second surface reflects the entered light outward in a radial direction centering at the rotation axis of the optical member,
the optical member includes a light guide part that guides the first detection light to a photoreception part of the sensor,
the light guide part includes a first light emission end part and a second light emission end part arranged side by side in the rotation direction of the optical member,
the first detection light includes second detection light and third detection light,
the first light emission end part emits the second detection light,
the second light emission end part emits the third detection light,
the sensor detects the light amount of the first detection light based on whether the first detection light is received or not and reception of at least the second detection light or the third detection light, the optical member includes a second prism part that emits irradiation light based on the light, and the second prism part changes light distribution of the irradiation light depending on the position of the optical member in the rotation direction when the optical member rotates.

* * * * *